(12) United States Patent
Roscoe et al.

(10) Patent No.: US 12,462,040 B2
(45) Date of Patent: Nov. 4, 2025

(54) CODE DEPLOYMENT

(71) Applicant: The Blockhouse Technology Limited, Oxford (GB)

(72) Inventors: Andrew William Roscoe, Oxford (GB); Pedro Ribeiro Goncalves Antonino, Oxford (GB)

(73) Assignee: The Blockhouse Technology Limited, Oxford (GB)

( * ) Notice: Subject to any disclaimer, the term of this patent is extended or adjusted under 35 U.S.C. 154(b) by 0 days.

(21) Appl. No.: 18/282,162

(22) PCT Filed: Mar. 18, 2022

(86) PCT No.: PCT/GB2022/050692
§ 371 (c)(1),
(2) Date: Sep. 14, 2023

(87) PCT Pub. No.: WO2022/195293
PCT Pub. Date: Sep. 22, 2022

(65) Prior Publication Data
US 2024/0296030 A1 Sep. 5, 2024

(30) Foreign Application Priority Data
Mar. 19, 2021 (GB) .................... 2103880

(51) Int. Cl.
*G06F 21/57* (2013.01)
*G06F 8/41* (2018.01)
(Continued)

(52) U.S. Cl.
CPC .............. *G06F 21/577* (2013.01); *G06F 8/41* (2013.01); *G06F 21/14* (2013.01); *G06F 21/51* (2013.01);
(Continued)

(58) Field of Classification Search
CPC .......... G06F 8/41; G06F 21/51; G06F 21/577; G06F 21/602; G06F 21/572; G06F 21/14; G06F 11/3676
(Continued)

(56) References Cited

U.S. PATENT DOCUMENTS 6,536,036 B1 * 3/2003 Pavela ................ G06F 11/3676
717/125
10,678,917 B1 6/2020 Witten et al.
(Continued)

FOREIGN PATENT DOCUMENTS

| CH | 716 297 A2 | 12/2020 |
|---|---|---|
| CN | 103914329 A | 7/2014 |

(Continued)

OTHER PUBLICATIONS

Ying, Kailiang, et al., TruZ-Droid: Integrating TrustZone with Mobile Operating System, MobiSys '18: Proceedings of the 16th Annual International Conference on Mobile Systems, Applications, and Services, Jun. 2018, 14 pages, [retrieved on Jun. 23, 2025], Retrieved from the Internet: <URL:http://dl.acm.org/>.*

(Continued)

*Primary Examiner* — Geoffrey R St Leger
(74) *Attorney, Agent, or Firm* — Klarquist Sparkman, LLP

(57) ABSTRACT

A method of operating a trusted execution environment for analysing source code from a third-party vendor is disclosed. The method comprises receiving an encrypted source code and using a secure key stored within the trusted execution environment to decrypt the encrypted source code to produce a decrypted source code. The decrypted source code is analyzed to determine a trust metric for the decrypted source code. The decrypted source code is disallowed from (Continued)

being communicated to an external entity outside of the trusted execution environment.

20 Claims, 7 Drawing Sheets

(51) Int. Cl.
  *G06F 21/14* (2013.01)
  *G06F 21/51* (2013.01)
  *G06F 21/60* (2013.01)
  *G06F 11/3668* (2025.01)
(52) U.S. Cl.
  CPC ........ *G06F 21/602* (2013.01); *G06F 11/3676* (2013.01)
(58) Field of Classification Search
  USPC .......................................................... 717/140
  See application file for complete search history.

(56) References Cited

U.S. PATENT DOCUMENTS

| | | | | |
|---|---|---|---|---|
| 2009/0083731 | A1* | 3/2009 | Sobel | G06F 21/51 |
| | | | | 717/177 |
| 2010/0281273 | A1* | 11/2010 | Lee | F04B 33/00 |
| | | | | 713/193 |
| 2012/0240236 | A1* | 9/2012 | Wyatt | G06F 21/10 |
| | | | | 726/25 |
| 2013/0007889 | A1 | 1/2013 | McCloy | |
| 2014/0281500 | A1* | 9/2014 | Ignatchenko | G06F 21/50 |
| | | | | 713/156 |
| 2015/0082304 | A1 | 3/2015 | Hepkin et al. | |
| 2015/0244737 | A1 | 8/2015 | Siman | |
| 2016/0004858 | A1 | 1/2016 | Chen et al. | |
| 2017/0103192 | A1* | 4/2017 | Hussey | G06F 8/71 |
| 2017/0364686 | A1 | 12/2017 | Stafford | |
| 2018/0157843 | A1 | 6/2018 | McDuff | |
| 2018/0285567 | A1 | 10/2018 | Raman | |
| 2019/0065709 | A1 | 2/2019 | Salomon | |
| 2019/0065757 | A1 | 2/2019 | Graf et al. | |
| 2020/0110905 | A1* | 4/2020 | O'Cleirigh | G06F 21/51 |
| 2020/0159922 | A1 | 5/2020 | Rubin | |
| 2020/0302059 | A1 | 9/2020 | Rubin | |

FOREIGN PATENT DOCUMENTS

| | | | | |
|---|---|---|---|---|
| CN | 104714829 A | | 6/2015 | |
| CN | 111177733 A | | 5/2020 | |
| EP | 3 495 978 A1 | | 6/2019 | |
| RU | 2289157 C2 | * | 10/2006 | .......... G06F 21/572 |
| TW | 201624276 A | | 7/2016 | |
| WO | WO-2016141383 A1 | * | 9/2016 | ............ G06F 21/57 |
| WO | WO 2020/114915 A1 | | 6/2020 | |

OTHER PUBLICATIONS

IPO Combined Search and Examination Report under Sections 17 and 18(3) for GB2103880.7, mailed Dec. 14, 2021, 10 pages.
International Search Report and Written Opinion for PCT/GB2022/050692, mailed Jul. 14, 2022, 23 pages.
Maene et al., "Hardware-Based Trusted Computing Architectures for Isolation and Attestation," *IEEE Transactions on Computers*, vol. 67, Issue 3, Mar. 2018, 14 pages.

* cited by examiner

CODE DEPLOYMENT

CROSS REFERENCE TO RELATED APPLICATIONS

This is the U.S. National Stage of International Application No. PCT/GB2022/050692, filed Mar. 18, 2022, which was published in English under PCT Article 21(2), which in turn claims the benefit of Great Britain Application No. 2103880.7, filed Mar. 19, 2021.

BACKGROUND OF THE INVENTION

The present invention relates to the deployment of source code, particularly though not exclusively in relation to the supply of software code and/or hardware description language code from a third party vendor to a recipient.

In recent years, trust in technology, particularly information technology (IT), has become an issue of significant importance. The more complex the technology (i.e. 'high tech') something is, and the closer it is to the core of civilisation, the more of an issue this becomes. It is important for those who acquire technology to be able to know that the technology can be trusted, however in general the vendor of that technology does not want to allow open inspection or auditing of the technology because to do so would potentially allow insights into valuable intellectual property. For example, a customer may not fully trust software or hardware provided by a particular vendor, but the vendor may be reluctant to allow the customer access to, for example, the underlying source code or circuit design.

An example of this problem can be seen in relation to core network technologies for telecommunications infrastructure. Given the critical and sensitive nature of this infrastructure, it is important that any technology source from third parties can be trusted. However, those third parties generally want to protect their IP to prevent customers or others from being able to acquire commercially sensitive information, e.g. that may allow for replication of their products.

Imagine the following scenario: Alice creates a product based on innovative ideas and Bob wants to purchase some. However, neither completely trusts the other:
  Alice does not want Bob to understand and misuse her IP.
  Bob does not trust that Alice's products are as claimed: he fears that either they have not been built to high enough functional or safety standards, or that they may contain malware or a "back door" that might allow Alice and her friends to breach his security.

To solve this, Bob's products need to be audited/verified by an entity that is trusted by Alice not to give away her secrets and by Bob only to say a product is satisfactory when it is. Conventionally this is done by auditors who check that Alice has rigorously followed standards when creating some product X or by a trusted third party who examines the design D and X independently of Alice's work in creating it. Typically, the auditing approach is more useful for functionality and safety, whereas the trusted third party is required (alongside things like penetration testing) for the security issue.

The Applicant has appreciated that it would be advantageous for technology to be 'transparently trustworthy'. A recipient of the technology should not have to have absolute trust in the vendor in order to trust technology supplied by that vendor. It would be beneficial for the vendor to be able to supply evidence of quality and trustworthiness that others can follow and verify, in a manner such that it simply should not make sense to accuse the products of being malevolent.

In particular, the Applicant has appreciated that it would be highly beneficial if, using the scenario outlined above, Bob could satisfy himself of two things:
  1. The analysis demonstrates that the product has the properties he wants.
  2. The design he has analysed corresponds in a well understood way to X so that the functionality/safety/security of X can be inferred from those of D.
  While Alice could satisfy herself that:
  3. the analysis should not reveal any of Alice's secret information to Bob or anyone else.

As outlined in further detail below, embodiments of the present invention seek to address the above problem.

SUMMARY OF THE INVENTION

When viewed from a first aspect, embodiments of the invention provide a method of operating a trusted execution environment for analysing source code from a third party vendor, the method comprising:
  receiving an encrypted source code into the trusted execution environment;
  using a secure key stored within the trusted execution environment to decrypt the encrypted source code within the trusted execution environment to produce a decrypted source code;
  analysing the decrypted source code within the trusted execution environment to determine a trust metric for the decrypted source code;
  compiling the decrypted source code within the trusted execution environment to produce generated executable code;
  outputting the generated executable code from the trusted execution environment, or receiving a supplied executable code into the trusted execution environment and comparing the supplied executable code to the generated executable code to determine a verification metric for the supplied executable code; and
  disallowing the decrypted source code from being communicated to an external entity outside of the trusted execution environment.

This first aspect of the invention extends to a trusted execution environment arranged to analyse source code from a third party vendor, the trusted execution environment comprising an analysis unit and a secure memory arranged to store a secure key, said trusted execution environment being arranged to:
  receive an encrypted source code;
  use the secure key to decrypt the encrypted source code to produce a decrypted source code;
  use the analysis unit to analyse the decrypted source code to determine a trust metric for the decrypted source code;
  compile the decrypted source code to generate executable code;
  output the generated executable code from the trusted execution environment, or receive a supplied executable code and compare the supplied executable code to the generated executable code to determine a verification metric for the supplied executable code; and
  disallow the decrypted source code from being communicated to an external entity outside of the trusted execution environment.

More generally, from another aspect, embodiments of the present invention provide a method of operating a trusted execution environment for analysing source code from a third party vendor, the method comprising:

receiving an encrypted source code;
using a secure key stored within the trusted execution environment to decrypt the encrypted source code to produce a decrypted source code;
analysing the decrypted source code to determine a trust metric for the decrypted source code; and
disallowing the decrypted source code from being communicated to an external entity outside of the trusted execution environment.

Thus it will be appreciated that, in accordance with aspects of the invention, an improved approach is provided in which source code (such as software code or hardware description language code, as outlined below) can be supplied from a vendor to the TEE (which may be in the possession of the recipient), and in which the recipient can trust the supplied source code, without requiring either or both parties (i.e. the recipient and vendor) to trust each other. However, as outlined below, in some embodiments the TEE is in the possession of the vendor, and the analysis is carried out without the source code being supplied directly to the recipient.

Specifically, the vendor may supply an encrypted copy of the source code, in some cases alongside corresponding executable code that the vendor alleges corresponds to the source code as outlined below. The recipient (e.g. customer) inputs the encrypted source code into a trusted execution environment (TEE) which may comprise a suitable analysis unit, as outlined below. This TEE has access to a key that allows decryption of the encrypted source code supplied by the vendor. This allows the TEE to conduct analysis on the source code and to supply suitable assurances (i.e. the trust metric) to the recipient of the software. In all cases the TEE does not output the decrypted source code. Additionally, the TEE uses the analysis unit to verify that the source code (and thus, by extension, the executable code) meets certain trust criteria. Thus the needs of both parties are met without either one needing to trust the other.

In other words, the TEE provides a 'transparency centre', that is it provides a construct configured to allow the examination of objects whose structure can be revealed inside the TEE but not outside of it.

It will be appreciated that, in the scenario described above, Alice (the vendor) can send the encrypted source code to Bob (the recipient) who may be in possession of the TEE. However, the Applicant has appreciated that, in some scenarios, the TEE may be in the possession of the vendor. In such a case, the TEE-which is trusted by both the vendor and the recipient—can, in some embodiments, carry out the analysis and generate an attestation report comprising the trust metric, where this attestation report is provided to the vendor (who may have the TEE). This attestation report may then be supplied to the recipient, e.g. together with an executable that corresponds to the source code on which the analysis was run, and the recipient can trust the attestation report as it originates from the TEE. As outlined in further detail with respect to certain embodiments of the invention below, the analysis carried out to generate the trust metric may be based on some specification (e.g. set by the recipient), where the specification outlines certain properties that should be checked for, even if the party that outlines the specification does not themselves have the TEE. For example, the vendor may hold the TEE and the recipient may outline a specification that they wish to be used during the tests conducted by the TEE.

Of course, a combination of these approaches is also possible, in which both the vendor and the recipient utilise a TEE, where the vendor uses a TEE to generate an attestation report for subsequent supply to the recipient (and optionally to compile the source code), and where the recipient uses a TEE to perform their own analysis, where the TEEs used by each party may be the same or may be different.

Those skilled in the art will appreciate that a 'trusted execution environment' (TEE) is a secure processing arrangement, which may form a portion of a larger processing arrangement or processor, such as a central processing unit (CPU). There are a number of different types of TEE, known in the art per se, to which the various aspects and embodiments of the present invention may be readily applied. The feature outlined above in which the decrypted source code is disallowed from being communicated outside of the trusted execution environment in practice means that the decrypted source code is retained securely within the trusted execution environment.

Thus, a TEE is a computing environment which can run general purpose programs. It typically has its own memory but can extend this with care by constrained and encrypted use of external memory. It can securely attest itself to users, so no user can reasonably believe they are using or seeing results from a TEE without this being true. This will generally involve attestation and some form of key agreement and the bootstrapping of signature mechanism between TEE and user. Generally speaking, a TEE will be configured only to use programs that are known and trusted by all parties. Furthermore, a TEE will typically be able to attest to the way it is configured.

It will be appreciated by those skilled in the art that the term 'source code' is used to mean the underlying code typically written wholly or partially by human(s) prior to any compilation process. This may be written in a conventional programming language such as: C; C++; C#; Java; Python; Visual Basic; JavaScript; R; SQL; or PHP, though it will be appreciated that this list is non-exhaustive and there are thousands of different programming languages, known in the art per se, to which the principles of the present invention readily apply. The present invention may also be used with proprietary programming languages that are not widely used, so long as the relevant analysis can be carried out on the code.

The term 'source code' should also be understood to extend to 'intermediate language' code, such as LLVM IR. Those skilled in the art will appreciate that intermediate code typically provides an intermediate representation between the source code (written in a high level programming language such as those listed above) and machine code for execution. The analysis and verification techniques that may be applied to source code in accordance with embodiments of the various aspects of the present invention may also be carried out on such intermediate code. Thus the vendor may supply the 'source code' in such an intermediate representation form.

Thus, as outlined above, in some embodiments the source code comprises software code. However, as well as being used to determine the trustworthiness of software supplied by a third party vendor, the Applicant has appreciated that principles of the present invention may also be applied to hardware. Those skilled in the art will appreciate that electronic circuits, in particular complex digital circuits, can be defined using a hardware description language (HDL), where a synthesiser (akin to a compiler used in software development) can convert the HDL description of the desired circuit behaviours into a 'netlist', i.e. a list of physical electronic components (typically from a predefined library of components) and the relevant connections between these, that once built into a physical circuit would have the properties defined in the HDL description. The term 'source code' as used herein should also be understood to encompass code written in HDL. Two commonly used HDLs are Verilog and VHDL, though these are merely exemplary and the principles of the present invention apply to any such HDLs. As such, in some embodiments, the source code comprises HDL code.

Those skilled in the art will further appreciate that the term 'executable code'—as used in relation to certain embodiments of the present invention—is used to mean code that can be executed by a processor in order to carry out the associated function(s). In general, executable code is derived from source code via a compilation process, which results in a 'binary' (also referred to as 'machine code' or 'machine-readable code'). While typically this takes a form that is illegible to humans, the term 'executable code' also extends to 'executable source code', where the human-readable code is executable. The term 'executable code' further extends to cover 'bytecode' (sometimes referred to as 'portable code' or 'p-code'), which those skilled in the art will appreciate is a form of instruction set designed for execution by a software interpreter or for further compilation into machine code.

The code provided by the vendor may be subject to some obfuscation process. For example, source code (or some intermediate code) may be obfuscated so as to render the code unintelligible to humans but nevertheless able to be compiled into an executable that provides the same function as an executable compiled from the source code pre-obfuscation, or can be executed in its obscured source code form.

It should be understood, however, that there is no strict requirement regarding the legibility or intelligibility of the source code or executable code to humans and/or machines. However, generally, the source code and executable code may be of forms such that the source code is comprehensible for the purposes of the analysis carried out within the TEE whereas the executable code may not be, or may be comprehensible but to a lesser extent than the source code. While the executable code generally won't be clear to humans, it should be understood that the source code also does not necessarily need to be clear to humans either, so long as the analysis conducted within the TEE can be carried out on that source code.

The 'trust metric' may provide a measure of whether the software can be trusted, and it may, at least in some embodiments, provide a binary 'yes'/'no' (or 'pass'/'fail', or similar) indication of whether the trust criteria is met. For example, a number of checks may be made as to the behaviour of the software, and a simple flag provided to the recipient of the software that indicates whether all of those checks passed or not. In some embodiments, the trust metric may provide more detail, and an output may be provided for each such check.

Additionally or alternatively, however, the trust metric may comprise a trustworthiness value (or a plurality of such values), rather than a binary decision. The recipient may determine and apply some suitable threshold trustworthiness level for installed software, or follow different procedures based on the trustworthiness value of the software.

The trust criteria may include, for example, whether the code maliciously attempts to open ports, access a memory address, install further software, or carry out any other nefarious or questionable activities.

Thus, in some embodiments, analysing the decrypted source code comprises determining whether the source code, when compiled and executed by a processor, attempts to open a port. This may help to identify software that is attempting to subvert network security by opening up ports for possible attacks.

In some potentially overlapping embodiments, analysing the decrypted source code comprises determining whether the source code, when compiled and executed by a processor, attempts to access a memory address or memory address range (e.g. a register or range of registers). Such attempts at accessing memory addresses outside the allowed range might be, for example, to gain access to sensitive data or to modify applications or data elsewhere in memory. In accordance with a certain set of embodiments, the TEE may check whether the source code attempts to access memory outside of a predetermined memory range. For example, the software may legitimately have access to one or more locations in memory, but have no justifiable reason to access memory addresses outside of that range. If the software does appear to attempt this, the source code may be deemed untrustworthy (or given a low trustworthiness value as appropriate).

In some further potentially overlapping embodiments, analysing the decrypted source code comprises determining whether the source code, when compiled and executed by a processor, attempts to install a further software application. Such an approach may identify attempts to provide 'back door' installations of further software applications that the recipient of the software did not wish to install and/or was not aware of.

In further potentially overlapping embodiments, analysing the decrypted source code comprises determining whether every line of code and/or conditional branch has been followed in a test. It will be understood that this test may, for example, comprise simulating the running of the program being analysed or running it within an isolated environment and executing (or 'exercising') all of the lines of code and following each conditional branch (i.e. following each option for 'if' statements, 'case' statements, and other such formulations where the code diverges) to check the behaviour of the code.

In yet further potentially overlapping embodiments, analysing the decrypted source code comprises determining whether the source code, when compiled and executed by a processor, attempts to run a further software application. In particular, the analysis may look for attempts to run a software application contained in data in such a way that its behaviour may be difficult to foresee or analyse.

The vendor may, in some embodiments, provide validation data that the vendor asserts that the software they are supplying meets. For example, the vendor may allege that their software passes certain tests, has a particular performance rating, meets a particular standard, or similar. The TEE may then be used to test whether the code truly does have the alleged properties. Thus, in some embodiments, the method further comprises:

receiving validation data from the third party vendor;
performing analysis on the decrypted source code and/or code derived from said decrypted source code and/or an object derived from said decrypted source code to generate first test data; and
comparing the validation data to the first test data;
optionally wherein the trust metric comprises a first indicator dependent on a similarity between the validation data and the first test data.

In addition to, or in the alternative, the recipient of the software may wish to conduct their own tests to see if the software supplied by the third party vendor meets a particular specification that can be specified by the recipient. Thus in some potentially overlapping embodiments, the method further comprises:

receiving supplied specification data;
performing analysis on the decrypted source code and/or code derived from said decrypted source code and/or an object derived from said decrypted source code to generate second test data; and
comparing the specification data to the second test data;
optionally wherein the trust metric comprises a second indicator dependent on a similarity between the specification data and the second test data.

It will be appreciated that the above analyses (i.e. when performing analysis with respect to received validation data and/or supplied specification data) may be carried out in respect of the decrypted source code itself, or it may be carried out on code or an object derived from that source code. This may, in the case of software, comprise an executable resulting from compilation of the decrypted source code. In the case of hardware, the analysis may be carried out with respect to a netlist or a simulation of a circuit, i.e. the object may comprise a netlist resulting from synthesis of the relevant HDL source code.

Typically, if the analysis within the TEE is conducted on code or an object derived from the source code, said code or object will be different to the executable (or hardware equivalent such as a netlist) supplied by the vendor. The source code may, for example, be compiled or synthesised into a different form more suited to the analysis within the TEE than the version supplied by the vendor.

While the output from the TEE resulting from the analysis could be supplied only to the recipient of the software, in some embodiments the method comprises generating feedback data comprising information regarding said analysis. In some such embodiments, the method may further comprise transmitting said feedback data to the third party vendor. The information supplied to the recipient of the software and the information supplied as feedback to the vendor may be the same information or may be different. For example, more detailed information might be supplied to the vendor regarding why their code did not pass a particular test, while the recipient might only be told that the test was not passed but not the details of why, which might otherwise 'give away' too much sensitive information regarding the underlying source code. The vendor may then take action to correct any faults discovered. This feedback may be supplied to the vendor, regardless of whether the TEE is in the possession of the recipient or the vendor.

In some embodiments, the method further comprises compiling the decrypted source code to produce an executable code and supplying said executable code as an output. Thus in accordance with such embodiments, suitable analysis can be performed on the source code without the recipient having access to the source code itself, and then the TEE can compile that source code and output the resulting executable code that can be trusted to correspond to the source code that was analysed.

The method may, additionally or alternatively, comprise compiling the decrypted source code to produce an intermediate code. This intermediate code may be compiled by the or a further compiler within the TEE or it may be supplied as an output of the TEE (e.g. if the vendor is satisfied that the intermediate code does not pose a significant risk to the underlying intellectual property being reverse engineered). As outlined previously, intermediate code may serve as a portable representation of the code suitable for later compilation into an executable.

In some embodiments, however, the third party vendor may supply the encrypted source code alongside executable code, where the third party vendor may allege that the executable code corresponds to the accompanying source code. Thus, in a set of embodiments, the method may comprise:

receiving an executable code from the third party vendor;
compiling the decrypted source code to produce a test executable code;
comparing the supplied executable code to the test executable code to determine a verification metric for the supplied executable code; and
disallowing the decrypted source code from being communicated to an external entity outside of the trusted execution environment.

In accordance with such embodiments, and outlined in further detail below with respect to another aspect of the invention, the TEE can check whether the source code supplied properly compiles to substantially the same executable code as the executable code supplied by the vendor. The 'test executable code' may be provided as an output in a certain set of embodiments.

In some embodiments in which the source code comprises HDL code, the method further comprises synthesising the decrypted HDL source code to produce a netlist and supplying said netlist as an output. Thus analysis can be performed on the HDL source code without the recipient having access to the HDL source code itself, and then the TEE can synthesise a netlist suitable for a given output, e.g. to 'build' the circuit using a field-programmable gate array (FPGA), an application-specific integrated circuit (ASIC), using discrete components, or any other such suitable technique, known in the art per se, for realising a hardware implementation of the device described by the HDL source code.

In some embodiments, however, the third party vendor may supply the encrypted HDL source code alongside a circuit design, where the third party vendor may allege that the netlist (or equivalent) corresponds to the accompanying HDL source code. Thus, in a set of embodiments, the method may comprise:

receiving a circuit design from the third party vendor;
synthesising the decrypted HDL source code to produce a test circuit design;
comparing the supplied circuit design to the test circuit design to determine a verification metric for the supplied circuit design; and
disallowing the decrypted HDL source code from being communicated to an external entity outside of the trusted execution environment.

It will be appreciated that the 'circuit design' may comprise a netlist, circuit diagram, circuit layout, a set of mask, or a integrated circuit or design for the same.

This aspect of the invention extends to a trusted execution environment arranged to analyse source code from a third party vendor, the trusted execution environment comprising an analysis unit and a secure memory arranged to store a secure key, said trusted execution environment being arranged to:

receive an encrypted source code;
use the secure key to decrypt the encrypted source code to produce a decrypted source code;
use the analysis unit to analyse the decrypted source code to determine a trust metric for the decrypted source code; and disallow the decrypted source code from being communicated to an external entity outside of the trusted execution environment.

In some embodiments, the analysis unit is arranged to generate an attestation report comprising the trust metric and to provide this attestation report to the vendor.

As outlined above, there are a number of different behaviours of the software that might be analysed when determining the trust metric. In some embodiments, the analysis unit is arranged to determine whether the source code, when compiled and executed by a processor, attempts to open a port.

In some potentially overlapping embodiments, the analysis unit is arranged to determine whether the source code, when compiled and executed by a processor, attempts to access a memory address.

In some further potentially overlapping embodiments, the analysis unit is arranged to determine whether the source code, when compiled and executed by a processor, attempts to install a further software application.

In further potentially overlapping embodiments, the analysis unit is arranged to determine whether every line of code and/or conditional branch has been followed in a test.

In yet further potentially overlapping embodiments, the analysis unit is arranged to determine whether the source code, when compiled and executed by a processor, attempts to run a further software application. In particular, the analysis unit may look for attempts to run a software application contained in data in such a way that its behaviour may be difficult to foresee or analyse.

In some embodiments, the trusted execution environment further comprises a compiler, said trusted execution environment being arranged to use the compiler to compile the decrypted source code to produce an executable code and to supply said executable code as an output of the trusted execution environment.

Additionally or alternatively, in some embodiments the trusted execution environment further comprises a compiler, said trusted execution environment being arranged to use the compiler to compile the decrypted source code to produce an intermediate code. The intermediate code may then be compiled by the or a further compiler, or it may, in some embodiments, be supplied as an output of the trusted execution environment.

In some embodiments, the trusted execution environment is further arranged to receive validation data from the third party vendor, wherein the analysis unit is arranged to:
perform analysis on the decrypted source code and/or executable code derived from said decrypted source code to generate first test data; and
compare the validation data to the first test data;
optionally wherein the trust metric comprises a first indicator dependent on a similarity between the validation data and the first test data.

In some embodiments, the trusted execution environment is further arranged to receive supplied specification data, wherein the analysis unit is arranged to:
perform analysis on the decrypted source code and/or code derived from said decrypted source code and/or an object derived from said decrypted source code to generate second test data; and
compare the specification data to the second test data;
optionally wherein the trust metric comprises a second indicator dependent on a similarity between the specification data and the second test data.

In some embodiments, the trusted execution environment is further arranged to generate feedback data comprising information regarding said analysis. The trusted execution environment may, in some such embodiments, be further arranged to transmit said feedback data to the third party vendor.

In a set of embodiments, the trusted execution environment is arranged to:
receive an executable code from the third party vendor;
compile the decrypted source code to produce a test executable code;
compare the supplied executable code to the test executable code to determine a verification metric for the supplied executable code; and
disallow the decrypted source code from being communicated to an external entity outside of the trusted execution environment.

This aspect of the invention also extends to a non-transitory computer-readable medium comprising instructions that, when executed by a processor, cause the processor to carry out a method of operating a trusted execution environment for analysing source code from a third party vendor, the method comprising:
receiving an encrypted source code;
using a secure key stored within the trusted execution environment to decrypt the encrypted source code to produce a decrypted source code;
analysing the decrypted source code to determine a trust metric for the decrypted source code; and
disallow the decrypted source code from being communicated to an external entity outside of the trusted execution environment.

This aspect of the invention further extends to a computer software product comprising instructions that, when executed by a processor, cause the processor to carry out a method of operating a trusted execution environment for analysing source code from a third party vendor, the method comprising:
receiving an encrypted source code;
using a secure key stored within the trusted execution environment to decrypt the encrypted source code to produce a decrypted source code;
analysing the decrypted source code to determine a trust metric for the decrypted source code; and
disallowing the decrypted source code from being communicated to an external entity outside of the trusted execution environment.

It will be appreciated that the optional features described hereinabove in respect of any or all of the method, trusted execution environment, non-transitory computer-readable medium, and computer software product of this aspect apply equally to the others of said method, trusted execution environment, non-transitory computer-readable medium, and computer software product of this aspect.

When viewed from a further aspect, embodiments of the present invention provide a method of operating a trusted execution environment for analysing source code from a third party vendor, the method comprising:
receiving a supplied executable code and an encrypted source code;
using a secure key stored within the trusted execution environment to decrypt the encrypted source code to produce a decrypted source code;
compiling the decrypted source code to produce a test executable code;
comparing the supplied executable code to the test executable code to determine a verification metric for the supplied executable code; and disallowing the decrypted source code from being communicated to an external entity outside of the trusted execution environment.

Thus it will be appreciated by those skilled in the art that, in accordance with this further aspect of the invention, the TEE may use a compiler to compile the decrypted source code and then verifies that the resulting executable code matches the executable code received from the vendor. This may advantageously help to ensure that the received executable code has not been modified in any way. As outlined above in respect of the other aspects of the invention, and below in respect of certain embodiments of this further aspect of the invention, analysis may also be performed on the received source code to provide a measure of the trustworthiness of the code.

In some embodiments, the verification metric comprises a measure of similarity between the test executable code and the supplied executable code. In some embodiments, the verification metric is a binary output (i.e. 'yes' or 'no' or similar such labels) that indicates either that the supplied executable code and the test executable match or does not match. The requirements to be defined as a 'match' may be that the two executable codes are identical, however in some embodiments there may instead be a requirement that the similarity exceeds some threshold, which may be predetermined. This may allow for slight variances in the two executable codes, which might for example be attributed to differences in the compiler or compilation process. In some cases, syntactic identity might be required (i.e. such that both executable codes are line-for-line identical), whereas in other cases only functional identity may be required (i.e. such that both executable codes are behaviorally identical).

It will be appreciated that there are a number of ways by which the two executable codes may be compared in order to determine whether they match. If syntactic identity is required, the two executable codes may be compared line-by-line to determine if they are the same. However, in some embodiments, the step of comparing the supplied executable code to the test executable code further comprises generating a hash of each of the supplied executable code and test executable code, and comparing said hashes to determine the verification metric. Those skilled in the art will appreciate that a hash is the result of a one-way function that takes a given input (in this case, each of the executable codes) and subjects it to a particular deterministic cryptographic process, driven by a key, to produce a 'scrambled' output that cannot be reversed to retrieve the original input. For a given key, the hashing function should return the same hash value for both executable codes if they are identical. Typically, any variation between the two codes will result in an entirely different hash for each code.

Of course, rather than subjecting the entirety of each the two executable codes to the hashing process, these may, in some embodiments, each be partially input to the hashing process to determine whether the selected portions of the executable codes are identical. This may allow for variations in certain parts of the executable codes, while requiring them to be identical elsewhere.

In some embodiments, the method further comprises analysing the decrypted source code to determine a trust metric. Thus, similarly to other aspects of the invention, the TEE may be used to analyse the source code supplied by the vendor to determine whether its functions and/or behaviours are trustworthy.

In some embodiments, analysing the decrypted source code comprises determining whether the source code, when compiled and executed by a processor, attempts to open a port. In some potentially overlapping embodiments, analysing the decrypted source code comprises determining whether the source code, when compiled and executed by a processor, attempts to access a memory address. In some further potentially overlapping embodiments, analysing the decrypted source code comprises determining whether the source code, when compiled and executed by a processor, attempts to install a further software application.

As outlined previously with respect to other aspects of the invention, the vendor may assert that certain validation data is met by the supplied code. In some embodiments, the method further comprises:
  receiving validation data from the third party vendor;
  performing analysis on the decrypted source code and/or code derived from said decrypted source code and/or an object derived from said decrypted source code to generate first test data; and
  comparing the validation data to the first test data;
  optionally wherein the trust metric comprises a first indicator dependent on a similarity between the validation data and the first test data. Thus in such arrangements, the recipient of the software can check that the supplied source code meets the validation requirements in question (which may be akin to those described previously), and then because the recipient can determine whether the source code properly corresponds to the supplied executable code, the recipient can infer that the executable code also meets the validation requirements.

Similarly, the recipient may have some specification that they wish to ensure the supplied executable meets. In some embodiments, the method further comprises:
  receiving supplied specification data;
  performing analysis on the decrypted source code and/or code derived from said decrypted source code and/or an object derived from said decrypted source code to generate second test data; and
  comparing the specification data to the second test data;
  optionally wherein the trust metric comprises a second indicator dependent on a similarity between the specification data and the second test data. The recipient of the software can check that the supplied source code meets the supplied specification (which may be akin to the specification described previously), and then because the recipient can determine whether the source code properly corresponds to the supplied executable code, the recipient can infer that the executable code also meets the supplied specification.

In some embodiments, the method further comprises generating feedback data comprising information regarding said analysis, optionally further comprising transmitting said feedback data to the third party vendor. In either of the foregoing aspects of the invention, the feedback where supplied may comprise information regarding to what degree the trustworthiness tests were passed or failed (i.e. in relation to the behaviour of the software) and/or to what degree the verification tests were passed or failed (i.e. in relation to whether the source and executable codes properly correspond to one another).

This further aspect of the invention extends to a trusted execution environment arranged to analyse source code from a third party vendor, the trusted execution environment comprising an analysis unit, a compiler, and a secure memory arranged to store a secure key, said trusted execution environment being arranged to:
  receive a supplied executable code and an encrypted source code;

use the secure key to decrypt the encrypted source code to produce a decrypted source code;
use the compiler to compile the decrypted source code to produce a test executable code;
use the analysis unit to compare the supplied executable code to the test executable code to determine a trust metric for the supplied executable code; and
disallow the decrypted source code from being communicated to an external entity outside of the trusted execution environment.

In some embodiments, the trust metric comprises a measure of similarity between the test executable code and the supplied executable code.

In some embodiments, the trusted execution environment further comprises a hashing logic, said hashing logic being arranged to generate a hash of each of the supplied executable code and test executable code, wherein the analysis unit is arranged to compare said hashes to determine the trust metric.

In some embodiments, the analysis unit is arranged to analyse the decrypted source code to determine a trust metric.

In some embodiments, the analysis unit is arranged to generate an attestation report comprising the trust metric and to provide this attestation report to the vendor.

In some embodiments, the analysis unit is arranged to determine whether the source code, when compiled and executed by a processor, attempts to open a port.

In some potentially overlapping embodiments, the analysis unit is arranged to determine whether the source code, when compiled and executed by a processor, attempts to access a memory address.

In some further potentially overlapping embodiments, the analysis unit is arranged to determine whether the source code, when compiled and executed by a processor, attempts to install a further software application.

In further potentially overlapping embodiments, the analysis unit is arranged to determine whether every line of code and/or conditional branch has been followed in a test.

In yet further potentially overlapping embodiments, the analysis unit is arranged to determine whether the source code, when compiled and executed by a processor, attempts to run a further software application. In particular, the analysis unit may look for attempts to run a software application contained in data in such a way that its behaviour may be difficult to foresee or analyse.

In some embodiments, the trusted execution environment is further arranged to receive validation data from the third party vendor, wherein the analysis unit is arranged to:
perform analysis on the decrypted source code and/or executable code derived from said decrypted source code to generate first test data; and
compare the validation data to the first test data;
optionally wherein the trust metric comprises a first indicator dependent on a similarity between the validation data and the first test data.

In some embodiments, the trusted execution environment is further arranged to receive supplied specification data, wherein the analysis unit is arranged to:
perform analysis on the decrypted source code and/or code derived from said decrypted source code and/or an object derived from said decrypted source code to generate second test data; and
compare the specification data to the second test data;
optionally wherein the trust metric comprises a second indicator dependent on a similarity between the specification data and the second test data.

In some embodiments, the trusted execution environment is further arranged to generate feedback data comprising information regarding said analysis. In some such embodiments, the trusted execution environment may be further arranged to transmit said feedback data to the third party vendor.

This further aspect of the invention also extends to a non-transitory computer-readable medium comprising instructions that, when executed by a processor, cause the processor to carry out a method of operating a trusted execution environment for analysing source code from a third party vendor, the method comprising:
receiving a supplied executable code and an encrypted source code;
using a secure key stored within the trusted execution environment to decrypt the encrypted source code to produce a decrypted source code;
compiling the decrypted source code to produce a test executable code;
comparing the supplied executable code to the test executable code to determine a verification metric for the supplied executable code; and
disallowing the decrypted source code from being communicated to an external entity outside of the trusted execution environment.

This further aspect of the invention further extends to a computer software product comprising instructions that, when executed by a processor, cause the processor to carry out a method of operating a trusted execution environment for analysing source code from a third party vendor, the method comprising:
receiving a supplied executable code and an encrypted source code;
using a secure key stored within the trusted execution environment to decrypt the encrypted source code to produce a decrypted source code;
compiling the decrypted source code to produce a test executable code;
comparing the supplied executable code to the test executable code to determine a verification metric for the supplied executable code; and
disallowing the decrypted source code from being communicated to an external entity outside of the trusted execution environment.

It will be appreciated that the optional features described hereinabove in respect of any or all of the method, trusted execution environment, non-transitory computer-readable medium, and computer software product of other aspects apply equally to the others of said method, trusted execution environment, non-transitory computer-readable medium, and computer software product of this further aspect.

These principles may also be extended to a scenario in which the vendor supplies two copies of source code to the recipient, a first copy which is obfuscated so as to be illegible to humans, and a second copy that is easier to read and analyse, but wherein the more legible copy is encrypted only for reading within the TEE.

Thus, when viewed from a further aspect, embodiments of the present invention provide a method of operating a trusted execution environment for analysing source code from a third party vendor, the method comprising:
receiving a supplied first source code and an encrypted second source code;
using a secure key stored within the trusted execution environment to decrypt the encrypted second source code to produce a decrypted second source code;

determining whether the decrypted second source code corresponds to the first source code; and disallowing the decrypted second source code from being communicated to an external entity outside of the trusted execution environment.

In some embodiments, the two source codes can be compared directly, e.g. by a suitable analysis unit. However, in other embodiments of this further aspect of the invention, the method further comprises:

compiling the first source code to produce a first executable code;

compiling the decrypted second source code to produce a second executable code; and comparing the first executable code to the second executable code to determine a verification metric.

This further aspect of the invention extends to a trusted execution environment arranged to analyse source code from a third party vendor, the trusted execution environment comprising an analysis unit, a compiler, and a secure memory arranged to store a secure key, said trusted execution environment being arranged to:

receive a supplied first source code and an encrypted second source code;

use a secure key stored within the trusted execution environment to decrypt the encrypted second source code to produce a decrypted second source code;

determine whether the decrypted second source code corresponds to the first source code; and disallow the decrypted second source code from being communicated to an external entity outside of the trusted execution environment.

This further aspect of the invention also extends to a non-transitory computer-readable medium comprising instructions that, when executed by a processor, cause the processor to carry out a method of operating a trusted execution environment for analysing source code from a third party vendor, the method comprising:

receiving a supplied first source code and an encrypted second source code;

using a secure key stored within the trusted execution environment to decrypt the encrypted second source code to produce a decrypted second source code;

determining whether the decrypted second source code corresponds to the first source code; and disallowing the decrypted second source code from being communicated to an external entity outside of the trusted execution environment.

This further aspect of the invention further extends to a computer software product comprising instructions that, when executed by a processor, cause the processor to carry out a method of operating a trusted execution environment for analysing source code from a third party vendor, the method comprising:

receiving a supplied first source code and an encrypted second source code;

using a secure key stored within the trusted execution environment to decrypt the encrypted second source code to produce a decrypted second source code;

determining whether the decrypted second source code corresponds to the first source code; and disallowing the decrypted second source code from being communicated to an external entity outside of the trusted execution environment.

In respect of this further aspect of the invention, the first source code may comprise obfuscated code, wherein the third party vendor alleges that the first source code corresponds to the second source code, subject to some obfuscation process, known in the art per se.

The Applicant has appreciated similar principles to those discussed hereinabove also apply in arrangements in which the vendor wishes to supply the executable to the recipient only in encrypted form, where the executable is to be run, for example, within a TEE. When viewed from a further aspect, embodiments of the present invention provide a method of operating a trusted execution environment for analysing executable code from a third party vendor, the method comprising: receiving an encrypted executable code;

using a secure key stored within the trusted execution environment to decrypt the encrypted executable code to produce a decrypted executable code;

analysing the decrypted executable code to determine a trust metric for the decrypted executable code; and disallowing the decrypted executable code from being communicated to an external entity outside of the trusted execution environment.

This further aspect of the invention extends to a trusted execution environment arranged to analyse executable code from a third party vendor, the trusted execution environment comprising an analysis unit and a secure memory arranged to store a secure key, said trusted execution environment being arranged to:

receive an encrypted executable code;

use the secure key to decrypt the encrypted executable code to produce a decrypted executable code;

use the analysis unit to analyse the decrypted executable code to determine a trust metric for the decrypted executable code; and disallow the decrypted executable code from being communicated to an external entity outside of the trusted execution environment.

This further aspect of the invention also extends to a non-transitory computer-readable medium comprising instructions that, when executed by a processor, cause the processor to carry out a method of operating a trusted execution environment for analysing executable code from a third party vendor, the method comprising:

receiving an encrypted executable code;

using a secure key stored within the trusted execution environment to decrypt the encrypted executable code to produce a decrypted executable code;

analysing the decrypted executable code to determine a trust metric for the decrypted executable code; and disallowing the decrypted executable code from being communicated to an external entity outside of the trusted execution environment.

This further aspect of the invention further extends to a computer software product comprising instructions that, when executed by a processor, cause the processor to carry out a method of operating a trusted execution environment for analysing executable code from a third party vendor, the method comprising:

receiving an encrypted executable code;

using a secure key stored within the trusted execution environment to decrypt the encrypted executable code to produce a decrypted executable code;

analysing the decrypted executable code to determine a trust metric for the decrypted executable code; and disallowing the decrypted executable code from being communicated to an external entity outside of the trusted execution environment.

Thus, in accordance with this further aspect of the invention, the vendor may not actually supply the source code to the recipient at all, and may also not provide a 'clean' or 'readable' version of the executable either. Instead, the executable may be supplied only in encrypted form, where the analysis is conducted on a decrypted copy of the executable securely held within the TEE.

The executable may also then be executed, and may be executed within the TEE that performs the analysis. Thus, in some embodiments, the method comprises executing the decrypted executable code within the trusted execution environment.

More generally, when viewed from a further aspect, embodiments of the present invention provide a method of operating a trusted execution environment for analysing code from a third party vendor, the method comprising:
  receiving an encrypted code;
  using a secure key stored within the trusted execution environment to decrypt the encrypted code to produce a code;
  analysing the decrypted code to determine a trust metric for the decrypted code; and
  disallowing the decrypted code from being communicated to an external entity outside of the trusted execution environment.

This further aspect of the invention extends to a trusted execution environment arranged to analyse code from a third party vendor, the trusted execution environment comprising an analysis unit and a secure memory arranged to store a secure key, said trusted execution environment being arranged to:
  receive an encrypted code;
  use the secure key to decrypt the encrypted code to produce a decrypted code;
  use the analysis unit to analyse the decrypted code to determine a trust metric for the decrypted code; and
  disallow the decrypted code from being communicated to an external entity outside of the trusted execution environment.

This further aspect of the invention also extends to a non-transitory computer-readable medium comprising instructions that, when executed by a processor, cause the processor to carry out a method of operating a trusted execution environment for analysing code from a third party vendor, the method comprising:
  receiving an encrypted code;
  using a secure key stored within the trusted execution environment to decrypt the encrypted code to produce a code;
  analysing the decrypted code to determine a trust metric for the decrypted code; and
  disallowing the decrypted code from being communicated to an external entity outside of the trusted execution environment.

This further aspect of the invention further extends to a computer software product comprising instructions that, when executed by a processor, cause the processor to carry out a method of operating a trusted execution environment for analysing code from a third party vendor, the method comprising:
  receiving an encrypted code;
  using a secure key stored within the trusted execution environment to decrypt the encrypted code to produce a code;
  analysing the decrypted code to determine a trust metric for the decrypted code; and
  disallowing the decrypted code from being communicated to an external entity outside of the trusted execution environment.

The 'code' in accordance with embodiments of this further aspect of the invention may comprise source code, intermediate code, executable code, or any other suitable code format as appropriate. In some embodiments, the code may (where appropriate) be compiled within the TEE, and may be executed, and may be executed within that TEE or another TEE.

More generally, when viewed from a further aspect, embodiments of the present invention provide a method of operating a trusted execution environment for analysing code from a third party vendor, the method comprising:
  receiving a first code and an encrypted second code;
  using a secure key stored within the trusted execution environment to decrypt the encrypted second code to produce a decrypted second code;
  determining whether the decrypted second code corresponds to the first code; and
  disallowing the decrypted second code from being communicated to an external entity outside of the trusted execution environment.

This further aspect of the invention extends to a trusted execution environment arranged to analyse code from a third party vendor, the trusted execution environment comprising an analysis unit and a secure memory arranged to store a secure key, said trusted execution environment being arranged to:
  use a secure key stored within the trusted execution environment to decrypt the encrypted second code to produce a decrypted second code;
  determine whether the decrypted second code corresponds to the first code; and
  disallow the decrypted second code from being communicated to an external entity outside of the trusted execution environment.

This further aspect of the invention also extends to a non-transitory computer-readable medium comprising instructions that, when executed by a processor, cause the processor to carry out a method of operating a trusted execution environment for analysing code from a third party vendor, the method comprising:
  using a secure key stored within the trusted execution environment to decrypt the encrypted second code to produce a decrypted second code;
  determining whether the decrypted second code corresponds to the first code; and
  disallowing the decrypted second code from being communicated to an external entity outside of the trusted execution environment.

This further aspect of the invention further extends to a computer software product comprising instructions that, when executed by a processor, cause the processor to carry out a method of operating a trusted execution environment for analysing code from a third party vendor, the method comprising:
  using a secure key stored within the trusted execution environment to decrypt the encrypted second code to produce a decrypted second code;
  determining whether the decrypted second code corresponds to the first code; and
  disallowing the decrypted second code from being communicated to an external entity outside of the trusted execution environment.

In some embodiments of this further aspect of the invention, the step of determining whether the decrypted second code corresponds to the first code comprises:
  compiling the decrypted second code to produce a third code; and comparing the first code to the third code to determine the verification metric.

The 'first code', 'second code', and 'third code' in accordance with embodiments of this further aspect of the invention may comprise source code, intermediate code, executable code, or any other suitable code format as appropriate. For example, the first and third codes may comprise executable code or intermediate code and/or the second code may comprise source code or intermediate code. In some embodiments, the code may be executed, and may be executed within that TEE or another TEE.

It will be appreciated that where embodiments of any of the foregoing aspects of the present invention relate to a trusted execution environment, such aspects also extend to an electronic device comprising a first processing portion and a second processing portion, said second processing portion being isolated from the first processing portion, wherein the second processing portion comprises the trusted execution environment. In such an arrangement, the terms 'trusted execution environment' and 'second processing portion' are used interchangeably.

In accordance with such embodiments, the first processing portion is an external entity outside of the second processing portion, such that the second processing portion prevents any decrypted code (e.g. source code) within that second processing portion (or any associated memory reserved for that second processing portion) from being provided to the first processing portion (or indeed any other external entity outside of the second processing portion).

Each processing portion may have access to a memory, however the second processing portion may have access to a dedicated memory that cannot be accessed by the first processing portion. This dedicated memory may be encrypted.

The first and second processing portions may each be separate areas within the same processor, or may comprise the same processor operated in accordance with a time-division multiplexing scheme in a manner known in the art per se.

It will also be appreciated that the optional features described hereinabove in respect of any of the foregoing aspect(s) of the invention apply equally to the other aspect(s) of the invention.

BRIEF DESCRIPTION OF THE DRAWINGS

Certain embodiments of the invention will now be described, by way of non-limiting example only, with reference to the accompanying drawings in which.

DETAILED DESCRIPTION

Figure 1:
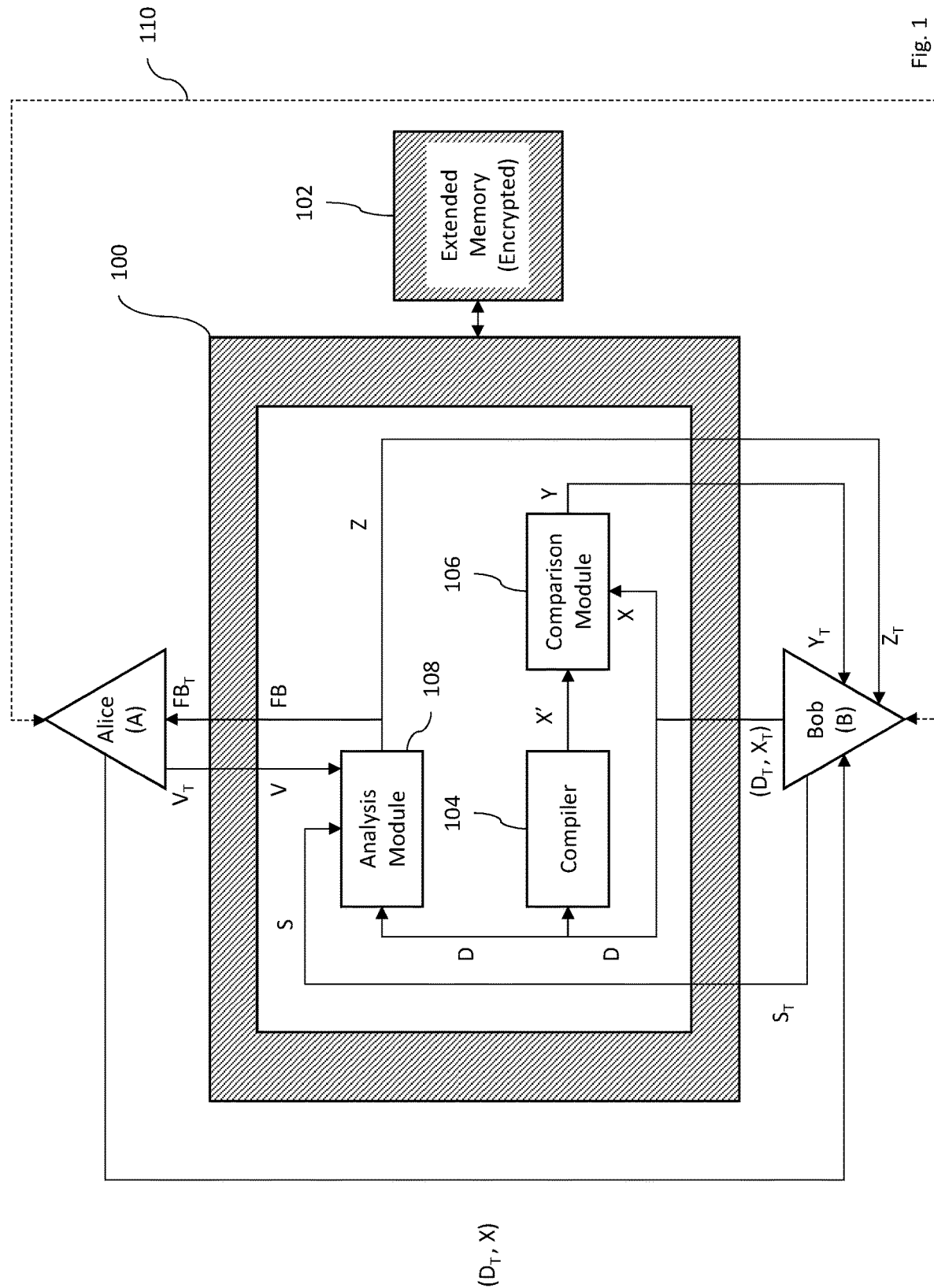
FIG. 1 is a block diagram of a TEE arranged to operate in accordance with an embodiment of the present invention.

FIG. 1 is a block diagram of a TEE 100 arranged to operate in accordance with an embodiment of the present invention. As is outlined in further detail below, the TEE 100 is arranged to facilitate the 'trustless' deployment of executable code X supplied by Alice (hereinafter 'A') to Bob (hereinafter 'B').

The executable X could be object code or could instead be hardware-related instead of software-related, for example X could be a circuit layout, schematic, or netlist. While the high level description language may be a little different from a high level programming language, and the low level one substantially different from machine code, the logical relationship in hardware is almost identical to that in software. The primary difference with hardware is that it is typically purchased in the form of many manufactured chips or devices supposedly corresponding to the low level design X, rather than a single binary file which actually is X. Therefore the hardware purchaser needs to prove that each instance of this implements X and nothing else. In practice this is likely to involve Bob or some other person he trusts manufacturing the hardware based on Alice's design, or a separately negotiated inspection regime.

In the present example, however, X is a software executable.

It should also be noted that X may form executable source code, and/or may be an obfuscated version of D, made illegible to humans through some obfuscation process but nevertheless able to be compiled in the same way as D to achieve the same function.

In general, X is almost certainly a high-technology product whose detailed design and/or logical structure is very difficult to discern by examination. This difficulty may arise because of Compilation: The natural distinction between source code—easy for humans to understand, and naturally reflecting logical structure—and object code that contains a huge amount of unstructured detail. The same distinction exists between high level (e.g. Verilog) and low level (e.g. net lists) hardware description languages.

Obfuscation: The use of technology such as program obfuscation which takes an input A and returns a semantically equal output B that is harder to understand or analyse. It makes sense to use this provided (i) it is effective and (ii) does not create an unacceptable overhead. It can be coupled with compilation and carried out on either source or object code. Similar techniques will apply to hardware designs.

Secure execution: An alternative is for Alice to take an executable form E of the product which is either D or derived from it, and put it in a shell which Bob can execute on a security-enhanced platform but cannot derive secret information about. The clearest option for this is that either X is E implemented on a TEE or similar, or X is E encrypted so it can be run by Bob in a TEE.

In this example, B wants to deploy the executable X supplied by A but does not trust that the X supplied by A does not have malicious functions. For example, X may be some core network technology that would have access to sensitive data and other parts of the core network, and so B needs to know that X is safe to use before deploying it. In an ideal world for B, he could gain access to the design D (i.e. the underlying source code) that was used to generate X. However, A does not wish to allow B to access D, because she does not trust B with the valuable intellectual property that D provides.

Put another way, D is represented by A to be a confidential and transparent explanation and description of the obscure product X. B wants to know that X truly does correspond to D, and that D (and by extension X) behaves in the desired manner.

Using conventional approaches, known in the art per se, this lack of trust between A and B may be circumvented using a further entity, trusted by both A and B, who could audit X and D to determine that X corresponded to D and was safe to use, i.e. it had the functions it was supposed to and did not act nefariously. However, this requires the existence of such an entity trusted by both A and B, which is more difficult in practice than would otherwise be desirable. This problem is solved by the TEE 100 arrangement of FIG. 1.

In a manner known in the art per se, the TEE 100 provides a 'secure world' which is isolated from entities outside of the TEE 100, as illustrated in FIG. 1 as a barrier (see bounding box with striped lines). Any data crossing the barrier into or out of the TEE 100 is encrypted, and the internal memory and state of the TEE 100 and the processes running inside that TEE 100 (on one or more processors or parts of processors within the TEE 100, not shown) cannot be accessed from outside the TEE 100. As a result, the TEE 100 should be seen as an impenetrable 'black box' which cannot supply its contents, or information about its contents, to the outside 'normal world' (sometimes referred to as the 'non-secure world' or 'not-as-secure world'). There are a number of different TEE implementations to which the present invention may be applied, however some notable examples are TrustZone® by Arm®, SGX by Intel®, and SEV by AMD®.

Elements having a reference appended with a subscript 'T' should be understood to mean that it is an encrypted copy of the element having the same reference without the subscript 'T', e.g. $D_T$ is an encrypted copy of D.

As outlined previously, the assumption is that B does not trust A to assert that D properly reduces to X and that the trust is obtained through the use of the TEE 100 (or similar such arrangement). Thus the TEE 100 must be able to prove to B what it is.

Specifically, the TEE 100 must be able to prove that D reduces to X under a process that guarantees to preserve the correctness properties established of D. D is visible inside the TEE, which can re-apply the process A used to derive X from it. In general, this will typically involve applying a mutually understood process C involving compilation and/or obfuscation. In some cases C will involve the use of public libraries.

In general, it is preferable if:
A. Bob understands C well, and knows (perhaps through evidence in the public domain and wide consensus) that it preserves the properties verified of D that are required by Bob.
B. C is deterministic, in the sense that if in two runs it is given the same input D, the output will be the same.

Some reduction processes including forms of obfuscation involve randomisation of code. However, these can be made consistent with this restriction by augmenting the secret design D by a random seed or key k that drives the random choices: so the extended $D'=(D,k)$: D is verified, the TEE shows that D' reduces to X, and (within the meaning of A above) Bob knows that C preserves the desired properties for every k. (Namely, every transformation of D created by C preserves them as k varies.)

The fact that this process is run in a TEE means that Alice is sure the details of D will not leak, and Bob can be sure that the two of them correspond.

In the arrangement of FIG. 1, A supplies X alongside $D_T$, where X is the executable as outlined above and $D_T$ is a copy of D encrypted such that only the TEE 100 can decrypt it, i.e. B cannot himself decrypt $D_T$ to obtain D as he does not have the required key. The decryption key is stored securely, either within the internal memory of the TEE 100 or within encrypted extended memory 102 (external to the TEE 100 itself) that can only be accessed by the TEE 100.

The TEE 100 comprises a compiler 104, a comparison module 106, and an analysis module 108, the functions of which are described in further detail below. These may all form part of a single integrated unit (i.e. they may all be functions carried out by the same processor), however some or all of these functions may be carried out by discrete and/or dedicated hardware within the TEE 100.

Once B receives $D_T$ and X from A, X is encrypted by B to produce $X_T$ suitable for input to the TEE 100. This is because, in accordance with this exemplary embodiment, communications that cross the boundary of the TEE 100 are to be encrypted. Of course, B could instead encrypt the pair ($D_T$, X) and supply those together instead.

The TEE 100 then performs a decryption operation. Specifically, the TEE 100 decrypts the source code $D_T$ to obtain D, which is input to the compiler 104 and the analysis module 108. The TEE 100 also decrypts $X_T$ to obtain the executable X which is input to the comparison module 106.

The analysis module 108 acts to determine the trustworthiness of X by examining the trustworthiness of D, as outlined with respect to FIG. 2 below. The compiler 104 and comparison module 106 act together to test whether X truly does correspond to D, as outlined with respect to FIG. 3 further below. While the TEE 100 of FIG. 1 is equipped to provide both of these functions, it will be appreciated that these two features are separable, although certain advantageous arrangements make use of both such functions.

In addition to supplying the executable X and the design $D_T$, A may also supply validation data V, which is encrypted to produce Vr suitable for supply to the TEE 100, and specifically to the analysis module 108. This validation data V comprises a set of attribute(s) that A asserts are properties of X and D. For example, V may include declarations that X and D have certain properties, certain functions, and/or perform in a certain way. The analysis module 108 may then seek to validate that the D supplied by A does properly meet those requirements set out in V.

Similarly, B may supply a specification S (encrypted as $S_T$ for input to the TEE 100), which is provided to the analysis module 108. This specification S may include one or more tests or properties that B wishes to test the software for. This may be bespoke or proprietary tests that are application-specific for B's intended use-case. B does not necessarily have to supply the specification S to A ahead of time, but may elect to do so via a communication path 110 between A and B (which may be the same path or a different path to the path over which $D_T$ and X are originally communicated from A to B).

Figure 2:
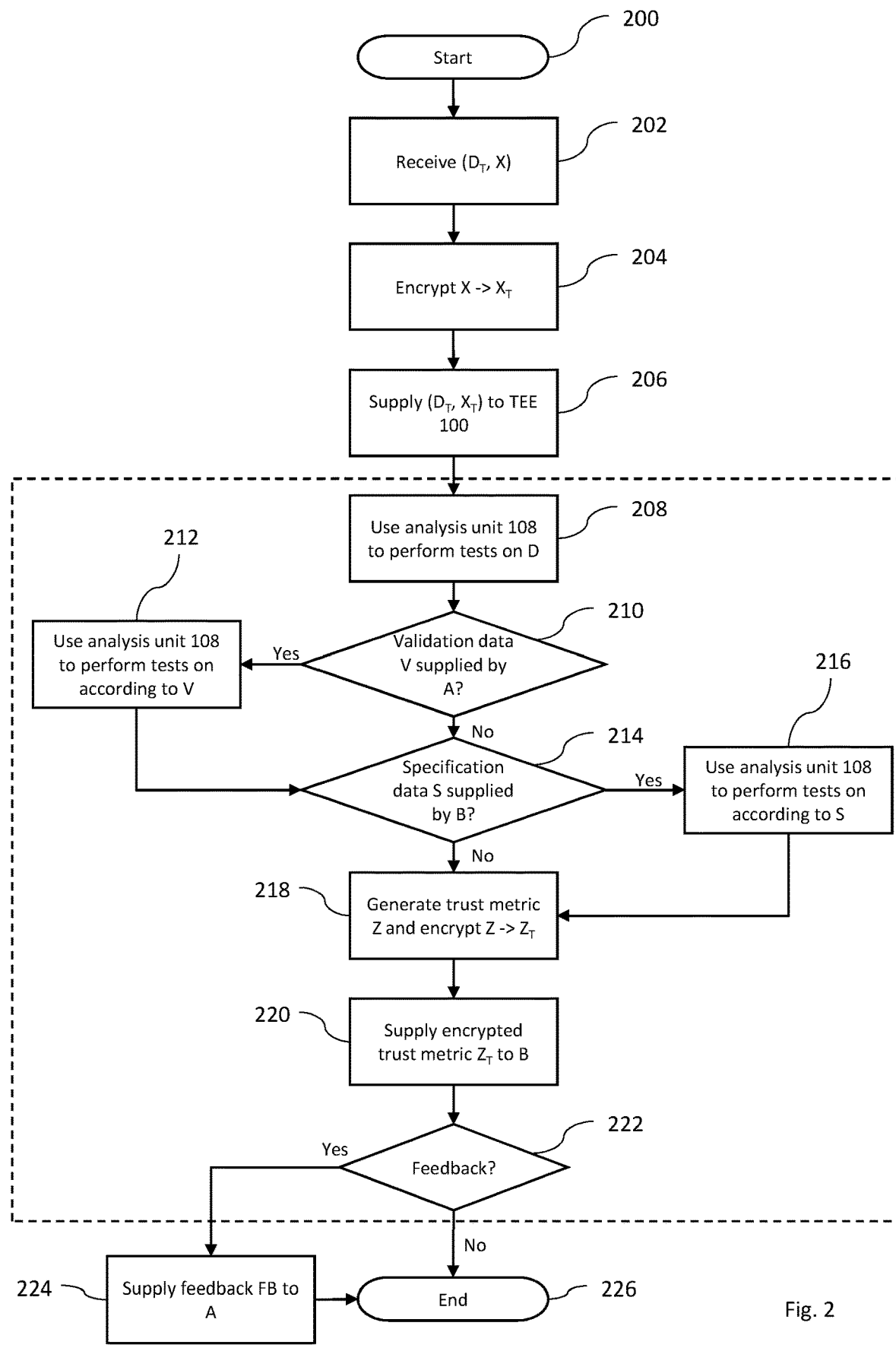
FIG. 2 is a flow chart illustrating operation of a method of operating the TEE of FIG. 1 to determine the trustworthiness of received source code in accordance with an embodiment of the invention.

FIG. 2 is a flow chart illustrating operation of a method of operating the TEE 100 to determine the trustworthiness of received source code D in accordance with an embodiment of the invention. The steps carried out within the TEE 100 are delimited by the dashed box, though it will be appreciated that this is an exemplary and illustrative embodiment and a greater number, a fewer number, and/or different steps may be carried out by the TEE 100 than are shown specifically on FIG. 2.

After the process is started at step 200, B receives the ($D_T$, X) pair from A at step 202 as outlined previously. The executable X is encrypted at step 204 to produce $X_T$ for communication to the TEE 100; and then the pair ($D_T$, $X_T$) are supplied to the TEE 100 at step 206.

Figure 3:
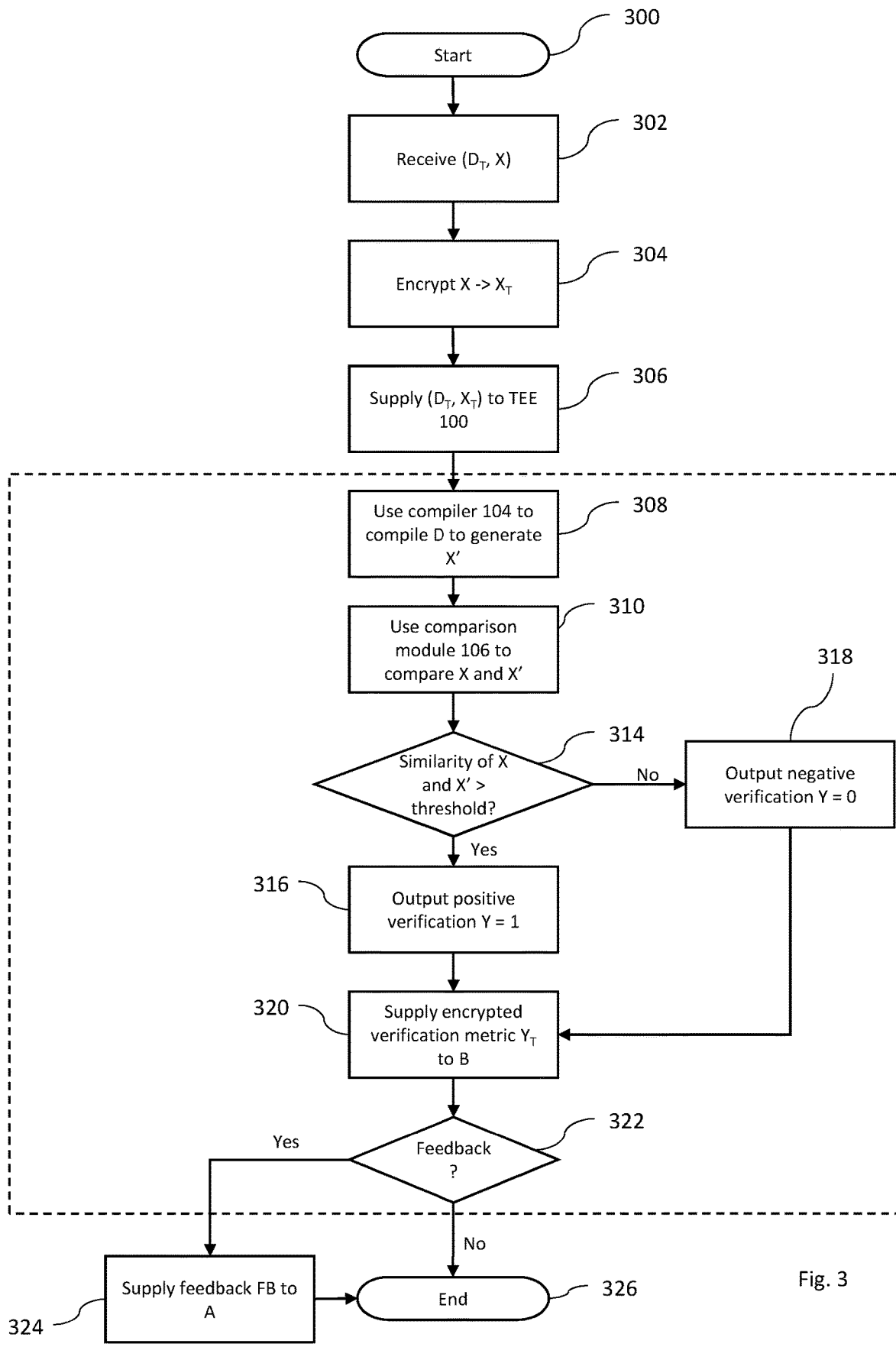
FIG. 3 is a flow chart illustrating operation of a method of operating the TEE of FIG. 1 to verify that received source code corresponds to a received executable in accordance with a further embodiment of the invention.

For the trustworthiness analysis process of FIG. 2, the executable X is not strictly required, as this is primarily used for the verification process of FIG. 3. However, as is explained in further detail below, the trustworthiness and verification analyses when both are used provide a particularly advantageous assessment of the software (or hardware) being supplied from A to B.

At step 208, the analysis unit 108 of the TEE 100 is used to conduct suitable analysis on the source code D to determine whether the source code D is trustworthy (and thus whether the associated executable X is trustworthy, provided these correspond to one another, see discussion below with respect to FIG. 3). The analysis conducted by the analysis unit 108 may include determining whether the source code D attempts to, for example, carry out one or more of the following potentially malicious functions: open a port; access a memory address (e.g. a memory address or register outside a specified allowable range); and/or install a further software application.

Types of tests that may be carried out, additionally or alternatively to those outlined above, include:

Testing based on the details of D, including white-box fuzzing and coverage analysis (which typically assesses whether every line of code has been executed or exercised and every conditional branch taken).

Program analysis: is this a suitable program, avoiding styles that might lead to obscurity or getting the way of testing based approaches. For example, the presence of complex data that guides control flow, as would be the case if the program represented a simulator for machine code encoded in data.

Analysis of data flows using type-based inference and similar such as taint analysis. Typically this would look if the values of fields intended to be secret can influence ones that will be seen by parties who are not supposed to know the secrets.

Proof or near-proof of specifications using verification tools such as model checkers, bounded model checkers, theorem provers.

Those skilled in the art will appreciate that there is a huge literature on both the specification and verification of both functional and security properties, and the analysis conducted within the TEE 100 may extend to many different types of analyses, and the scope of the present invention is not limited to any particular set of analyses conducted.

At step 210 a check is made as to whether validation data V has been supplied by A in which A asserts certain properties are exhibited by D and X. If so, the process moves to step 212, in which the analysis unit 108 carried out suitable tests to check whether the validation data V is accurate, and that the source code D truly does have the properties that A asserts that it does.

Once these validation tests are carried out, or if no such validation data V is supplied by A, a further check is made at step 214 to check whether B has supplied specification data S, i.e. if B has provided any requirements of his own that he wants to check the source code D against. If so, the analysis unit 108 carries out one or more tests to check whether the specification S is met at step 216.

Once these specification tests are carried out, or if no such specification data S is supplied by B, the process moves on to step 218 in which it generates a trust metric Z that comprises information regarding the tests conducted at step 208, and optionally the tests at steps 212 and/or 216. This trust metric Z may be a binary 'yes' or 'no' (or some intermediate 'maybe' state), or it may provide more detailed information, such as a percentage trust score or a breakdown of which tests were passed and/or failed. Optionally, the trust metric Z might also include information as to the severity of any failure or any potential issues that are of concern. This trust metric Z is then encrypted to produce Zr which is suitable for crossing the boundary of the TEE 100 and being supplied to B to indicate the trustworthiness of the source code D.

At step 222, a check is made as to whether feedback regarding one or more of the tests is to be supplied to A. If so, a feedback signal FB is provided to A containing the appropriate information at step 224. Once this is done, or if no such feedback is required, the process ends at step 226.

FIG. 3 is a flow chart illustrating operation of a method of operating a TEE to verify that received source code corresponds to a received executable in accordance with a further embodiment of the invention. The steps carried out within the TEE 100 are delimited by the dashed box, though it will be appreciated that this is an exemplary and illustrative embodiment and a greater number, a fewer number, and/or different steps may be carried out by the TEE 100 than are shown specifically on FIG. 3.

After the process is started at step 300, B receives the ($D_T$, X) pair from A at step 302 as outlined previously. The executable X is encrypted at step 204 to produce $X_T$ for communication to the TEE 100; and then the pair ($D_T$, $X_T$) are supplied to the TEE 100 at step 306.

At step 308, the compiler 104 is used to compile the source code D to generate a test executable X'. This test executable X' and the executable X provided by A are then input to the comparison module 106 at step 310, and the comparison module 106 compares these two executables X, X' to determine their similarity. At step 314, a determination is made as to whether the executables X, X' are sufficiently similar, i.e. whether their similarity exceeds some threshold. The threshold may be set to 100% so as to require them to be identical, though some variation may be tolerated, e.g. to account for differences in compilation processes.

If the similarity is sufficient, a verification metric Y is set to 'yes', which in this example is achieved by setting a binary flag to '1' at step 316. Conversely, if the similarity is insufficient, the verification metric Y is set to 'no, which in this example is achieved by setting the binary flag to '0' at step 318. However, it will be appreciated that instead of a simple 'yes' or 'no', the degree of similarity (or some metric derived from that similarity) could be output as Y instead, e.g. Y could take some value from 0 (completely dissimilar) to 1 (identical).

This verification metric Y is then encrypted to produce $Y_T$ which is suitable for crossing the boundary of the TEE 100 and being supplied to B to indicate the trustworthiness of the source code D, and is supplied to B at step 320.

At step 322, a check is made as to whether feedback regarding the verification is to be supplied to A. If so, a feedback signal FB is provided to A containing the appropriate information at step 324. Once this is done, or if no such feedback is required, the process ends at step 326.

Figure 4:
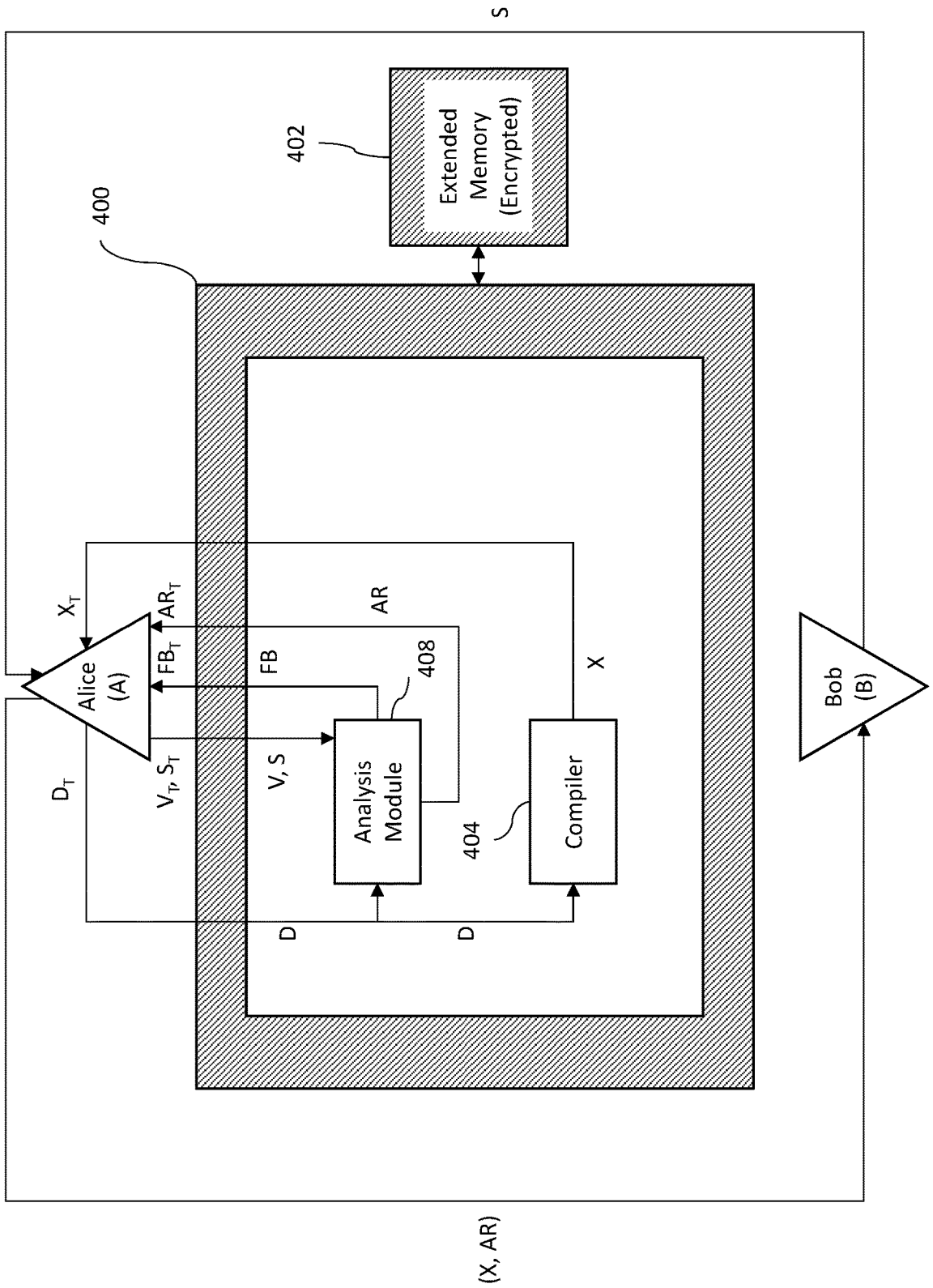
FIG. 4 is a block diagram of a TEE arranged to operate in accordance with a further embodiment of the present invention.

FIG. 4 is a block diagram of a TEE 400 arranged to operate in accordance with a further embodiment of the present invention. As with the TEE 100 of FIG. 1 described previously, the TEE 400 is arranged to facilitate the 'trustless' deployment of executable code X supplied by Alice (hereinafter 'A') to Bob (hereinafter 'B'). However, in this embodiment, the TEE 400 is in the possession of A, rather than B.

For ease of reference, elements having reference numerals beginning with a '4' correspond in form and function to the corresponding elements having reference numerals beginning with a '1' in FIG. 1, unless context dictates otherwise.

In this arrangement, A does not supply $D_T$ to B, and instead inputs $D_T$ to the TEE 400 herself. The TEE 400 decrypted $D_T$ to obtain D in the same manner as before, and D is input to the analysis module 408. The analysis produces a trust metric in the same way as outlined previously with respect to FIGS. 1 to 3, where the analysis may be based on validation data V (set by A) and/or specification data S (set by B).

However, unlike the arrangement of FIG. 1, the TEE 400 of FIG. 4 generates an attestation report AR including the trust metric, where this AR is supplied to A as ART. This attestation report AR is then sent to B alongside X. B can then trust AR because it was generated by the TEE 400. This AR testifies to B that the TEE 400 has seen a D which compiles to X and that satisfies the trust criteria set.

The TEE 400 in this case is also used for the compilation of D to produce X, which is supplied to A as $X_T$. Of course, A could instead compile D herself to produce X outside of the TEE 400 in some other arrangements.

Figure 5:
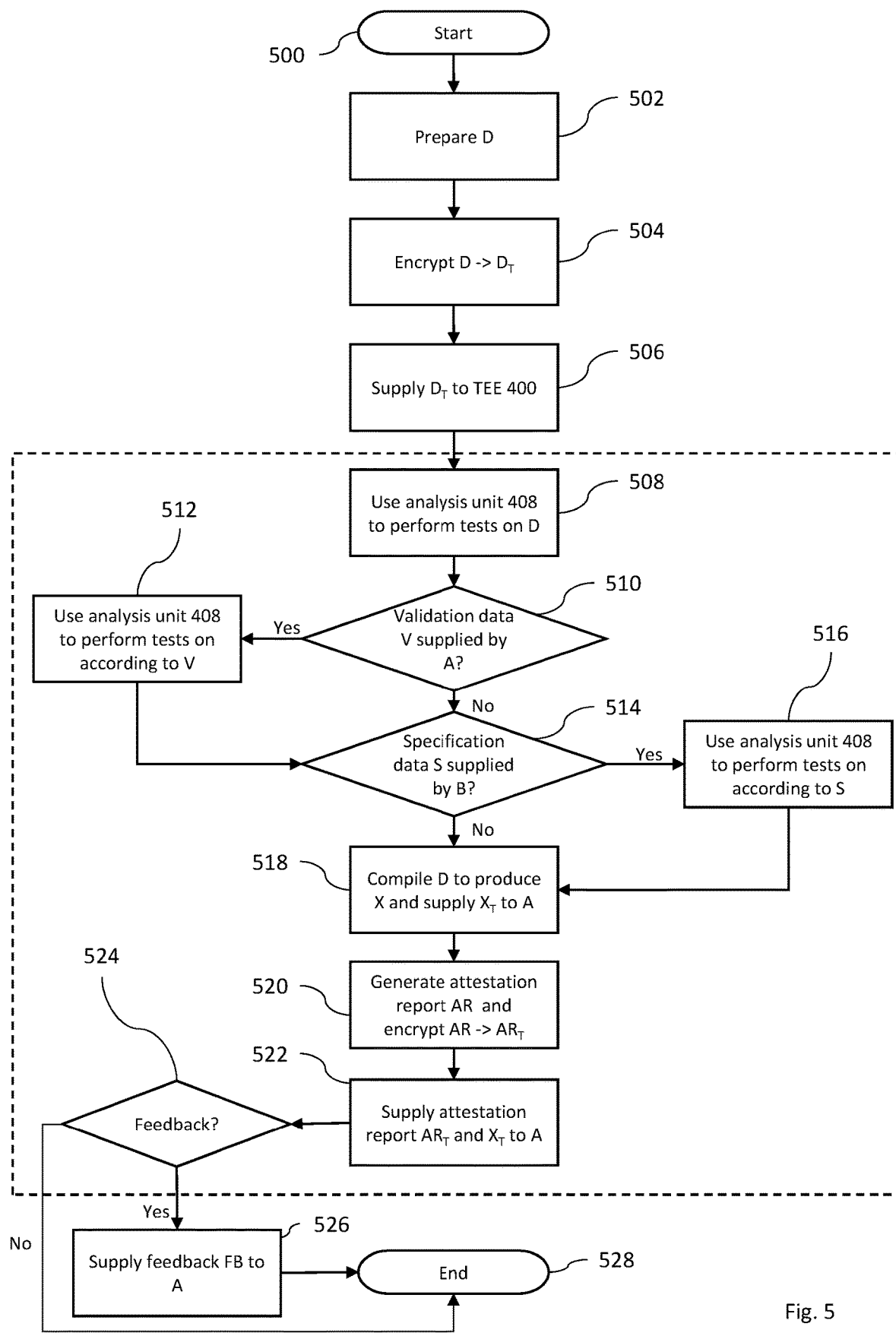
FIG. 5 is a further flow chart illustrating operation of a method of operating the TEE of FIG. 4 to determine the trustworthiness of received source code in accordance with an embodiment of the invention.

FIG. 5 is a flow chart illustrating operation of a method of operating the TEE 400 to attest to the trustworthiness of source code D to be supplied to B in its executable form X, in accordance with an embodiment of the invention. The steps carried out within the TEE 400 are delimited by the dashed box, though it will be appreciated that this is an exemplary and illustrative embodiment and a greater number, a fewer number, and/or different steps may be carried out by the TEE 400 than are shown specifically on FIG. 5.

After the process is started at step 500, A prepares D at step 502 and encrypts D at step 504 to produce $D_T$ for communication to the TEE 400. The encrypted source code $D_T$ is then supplied to the TEE 400 at step 506. While A could compile D herself outside of the TEE 400 to produce X for supply to B, as outlined in further detail below in this embodiment, D is compiled within the TEE 400 using the compiler 404 to produce X and the resulting output is supplied to B (via A).

At step 508, the analysis unit 408 of the TEE 400 is used to conduct suitable analysis on the source code D to determine whether the source code D is trustworthy. The analysis conducted by the analysis unit 108 may include determining whether the source code D attempts to, for example, carry out one or more of the following potentially malicious functions: open a port; access a memory address (e.g. a memory address or register outside a specified allowable range); and/or install a further software application.

Types of tests that may be carried out, additionally or alternatively to those outlined above, include:

Testing based on the details of D, including white-box fuzzing and coverage analysis (which typically assesses whether every line of code has been executed or exercised and every conditional branch taken).

Program analysis: is this a suitable program, avoiding styles that might lead to obscurity or getting the way of testing based approaches. For example, the presence of complex data that guides control flow, as would be the case if the program represented a simulator for machine code encoded in data.

Analysis of data flows using type-based inference and similar such as taint analysis. Typically this would look if the values of fields intended to be secret can influence ones that will be seen by parties who are not supposed to know the secrets.

Proof or near-proof of specifications using verification tools such as model checkers, bounded model checkers, theorem provers.

As before, the analysis conducted within the TEE 400 may extend to many different types of analyses, and the scope of the present invention is not limited to any particular set of analyses conducted.

At step 510 a check is made as to whether validation data V has been supplied by A in which A asserts certain properties are exhibited by D and X. If so, the process moves to step 512, in which the analysis unit 408 carried out suitable tests to check whether the validation data V is accurate, and that the source code D truly does have the properties that A asserts that it does.

Once these validation tests are carried out, or if no such validation data V is supplied by A, a further check is made at step 514 to check whether B has supplied specification data S, i.e. if B has provided any requirements of his own that he wants to check the source code D against. If so, the analysis unit 408 carries out one or more tests to check whether the specification S is met at step 516.

Once these specification tests are carried out, or if no such specification data S is supplied by B, the process moves on to step 518, in which the TEE 400 uses the compiler 404 to compile D and thereby generate X.

The process then moves on to step 520 in which it generates an attestation report AR based on a trust metric that comprises information regarding the tests conducted at step 508, and optionally the tests at steps 512 and/or 516. This attestation report AR, which is tied to the executable X generated at step 518, is then encrypted to produce ART which is suitable for crossing the boundary of the TEE 400 and being supplied to A to indicate the trustworthiness of the source code D.

At step 522, the attestation report ART and (encrypted) executable $X_T$ are supplied to A, who can then supply these as a pair to B as shown in FIG. 4. As per FIG. 4, the pair of the attestation report AR and executable X may be supplied in unencrypted form. Based on AR, B may then trust that X is trustworthy and that it corresponds to the D that the TEE 400 had when it generated the AR.

At step 524, a check is made as to whether feedback regarding one or more of the tests is to be supplied to A. If so, a feedback signal FB is provided to A containing the appropriate information at step 526.

Once this is done, or if no such feedback is required, the process ends at step 528. Thus it will be appreciated that embodiments of the present invention provide an improved approach in which a TEE is used to provide a 'transparency centre' which allows two parties that do not trust one another to exchange some object such as a software executable or hardware and the associated underlying design (e.g. source code) to allow 'trustless deployment' without requiring any further entity trusted by both the vendor and the recipient.

Figure 6:
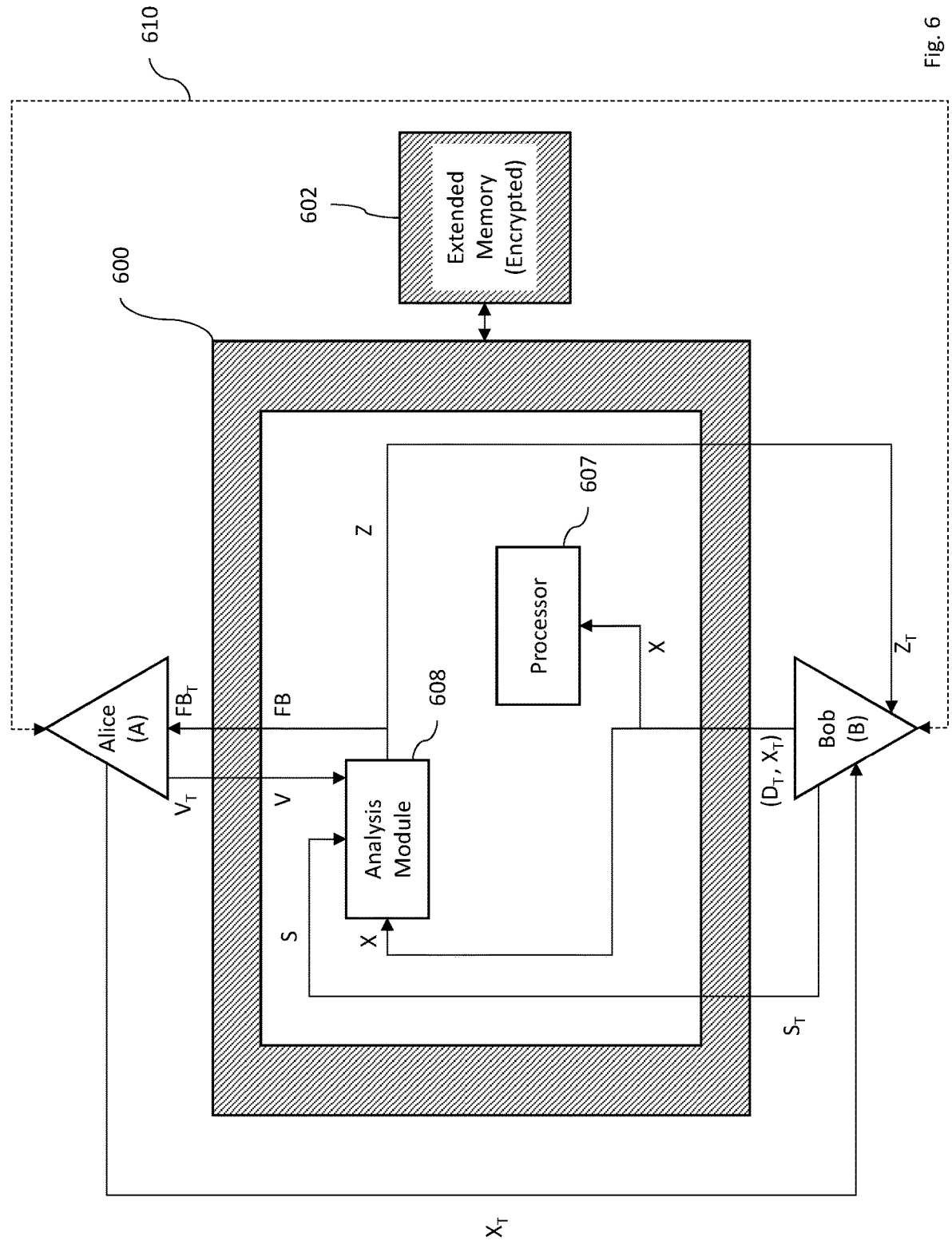
FIG. 6 is a block diagram of a TEE arranged to operate in accordance with another embodiment of the present invention.

FIG. 6 is a block diagram of another TEE 600 in accordance with a further embodiment of the present invention. For ease of reference, elements having reference numerals beginning with a '6' correspond in form and function to the corresponding elements having reference numerals beginning with a '1' in FIG. 1, unless context dictates otherwise. The TEE 600 of FIG. 6 also includes a processor 607 which can execute executable code. This processor 607 may be any suitable processing portion or means, and may be a different processor to any processor or processing means to any such processor or processing portion or means that carries out the other functions of the TEE.

In the arrangement of FIG. 6, A supplies only an encrypted version of the executable $X_T$. $X_T$ is encrypted such that only the TEE 100 can decrypt it, i.e. B cannot himself decrypt $X_T$ to obtain X as he does not have the required key. The decryption key is stored securely, either within the internal memory of the TEE 600 or within encrypted extended memory 602 (external to the TEE 600 itself) that can only be accessed by the TEE 600.

The TEE 600 comprises an analysis module 608, the functions of which are similar to those discussed previously, except in that the analysis module 608 in FIG. 6 can carry out its analysis on executable code.

Once B receives $X_T$ from A, $X_T$ is input to the TEE 600, which performs a decryption operation to obtain X, which is input to the analysis module 608. The analysis module 608 acts to determine the trustworthiness of X by examining X directly, as outlined with respect to FIG. 7 below.

In addition to supplying the encrypted executable $X_T$, A may also supply validation data V (encrypted as $V_T$) as outlined hereinabove. Similarly, B may supply a specification S (encrypted as $S_T$). $V_T$ and/or $S_T$ may be provided to the analysis module 608 which uses these in substantially the same manner as described before, where the difference is that the analysis is now being conducted on executable code rather than source code.

The decrypted executable code X is also executed within the TEE 600, using the processor 607. As such, in this particular arrangement B does not actually execute the code himself, but instead runs it within the TEE 600 which also checks that the code X is trustworthy.

Figure 7:
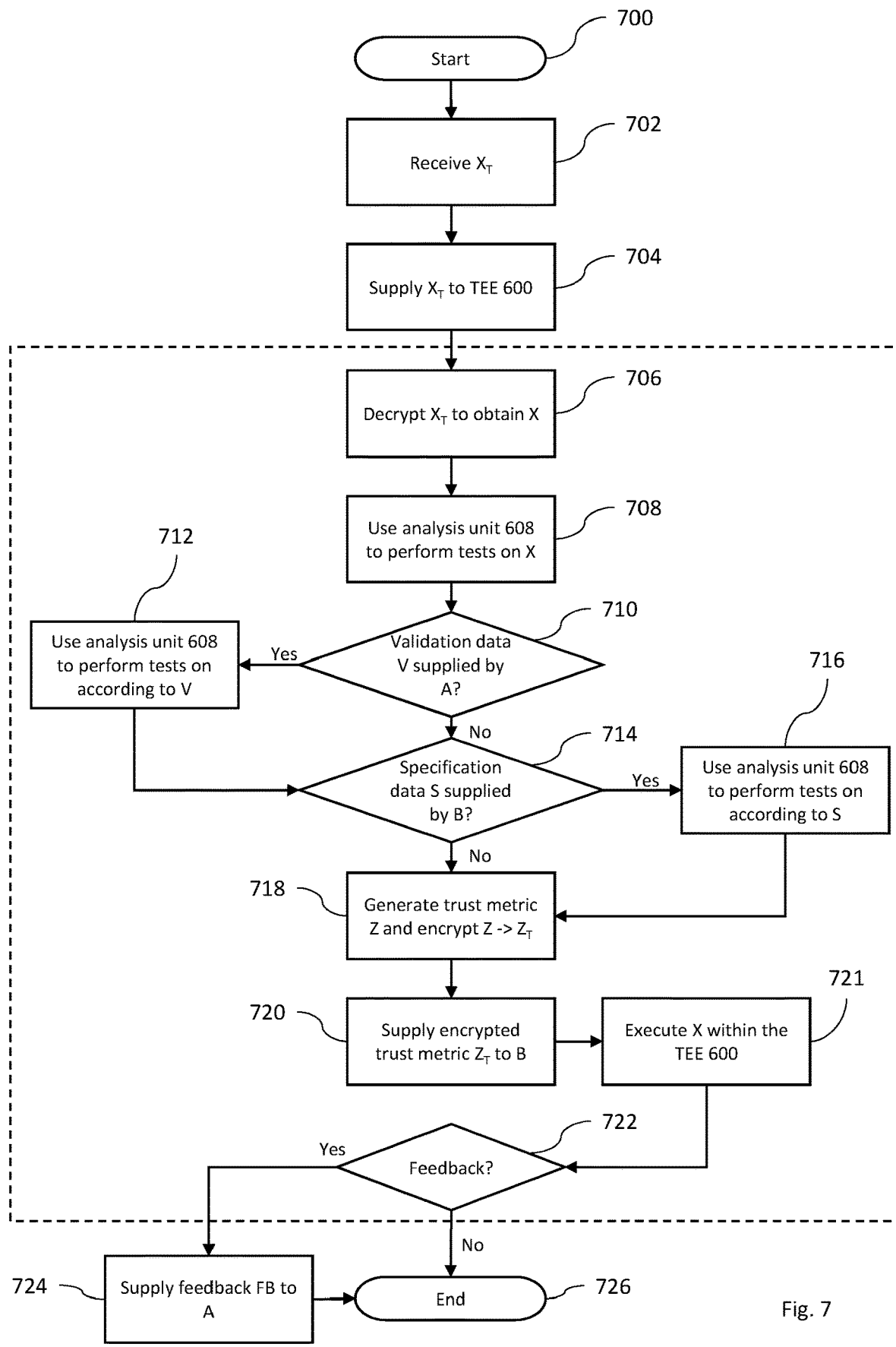
FIG. 7 is a flow chart illustrating operation of a method of operating the TEE of FIG. 6 to determine the trustworthiness of received executable code in accordance with another embodiment of the invention.

FIG. 7 is a flow chart illustrating operation of a method of operating the TEE 600 to determine the trustworthiness of received executable code X in accordance with an embodiment of the invention. The steps carried out within the TEE 600 are delimited by the dashed box, though it will be appreciated that this is an exemplary and illustrative embodiment and a greater number, a fewer number, and/or different steps may be carried out by the TEE 600 than are shown specifically on FIG. 7.

After the process is started at step 700, B receives the encrypted executable code $X_T$ from A at step 702 as outlined previously. The encrypted executable $X_T$ is supplied to the TEE 600 at step 704.

At step 708, the analysis unit 608 of the TEE 600 is used to conduct suitable analysis on the executable code X to determine whether the executable X is trustworthy. The analysis conducted by the analysis unit 608 may include determining whether the executable code X attempts to, for example, carry out one or more of the following potentially malicious functions: open a port; access a memory address (e.g. a memory address or register outside a specified allowable range); and/or install a further software application. The types of tests that may be carried out include those discussed previously hereinabove.

At step 710 a check is made as to whether validation data V has been supplied by A in which A asserts certain properties are exhibited by X. If so, the process moves to step 712, in which the analysis unit 608 carried out suitable tests to check whether the validation data V is accurate, and that the executable code x truly does have the properties that A asserts that it does.

Once these validation tests are carried out, or if no such validation data V is supplied by A, a further check is made at step 714 to check whether B has supplied specification data S, i.e. if B has provided any requirements of his own that he wants to check the source code D against. If so, the analysis unit 608 carries out one or more tests to check whether the specification S is met at step 716.

Once these specification tests are carried out, or if no such specification data S is supplied by B, the process moves on to step 718 in which it generates a trust metric Z that comprises information regarding the tests conducted at step 708, and optionally the tests at steps 712 and/or 716. This trust metric Z may be a binary 'yes' or 'no' (or some intermediate 'maybe' state), or it may provide more detailed information, such as a percentage trust score or a breakdown of which tests were passed and/or failed. Optionally, the trust metric Z might also include information as to the severity of any failure or any potential issues that are of concern. This trust metric Z is then encrypted to produce Zr which is suitable for crossing the boundary of the TEE 600 and being supplied to B to indicate the trustworthiness of the source code D.

In this particular embodiment, the executable X is then executed by the processor 607 within the TEE 600 at step 712. Thus B does not, at least in this embodiment, run X outside of the TEE 600 and does not have access to the decrypted executable X. This prevents B from being able to reverse engineer the executable X to obtain the underlying IP (e.g. some form of the underlying source code). It will be appreciated, however, that the executable X could be run elsewhere, with the TEE 600 performing the analysis only.

At step 722, a check is made as to whether feedback regarding one or more of the tests is to be supplied to A. If so, a feedback signal FB is provided to A containing the appropriate information at step 724. Once this is done, or if no such feedback is required, the process ends at step 726.

While specific embodiments of the present invention have been described in detail, it will be appreciated by those skilled in the art that the embodiments described in detail are not limiting on the scope of the claimed invention.

The invention claimed is:

1. A method of operating a trusted execution environment for analyzing source code received, by a recipient, from a vendor, the method comprising:
   receiving an encrypted source code into the trusted execution environment;
   receiving supplied data into the trusted execution environment, wherein the supplied data is validation data supplied by the vendor or specification data supplied by the recipient;
   using a secure key stored within the trusted execution environment to decrypt the encrypted source code within the trusted execution environment to produce a decrypted source code;
   analyzing the decrypted source code within the trusted execution environment to determine a trust metric for the decrypted source code;

compiling the decrypted source code within the trusted execution environment to produce generated executable code;

outputting the generated executable code from the trusted execution environment, or receiving a supplied executable code into the trusted execution environment and comparing the supplied executable code to the generated executable code to determine a verification metric for the supplied executable code; and disallowing the decrypted source code from being communicated to an external entity outside of the trusted execution environment, wherein the analyzing the decrypted source code to determine a trust metric comprises:

performing analysis on the decrypted source code and/or code derived from said decrypted source code and/or an object derived from said decrypted source code, within the trusted execution environment, to generate test data; and comparing the supplied data to the test data within the trusted execution environment; and wherein the trust metric comprises an indicator dependent on a similarity between the supplied data and the test data.

2. The method as claimed in claim 1, wherein the verification metric comprises a measure of similarity between the generated executable code and the supplied executable code.

3. The method as claimed in claim 1, wherein the step of comparing the supplied executable code to the generated executable code further comprises generating a hash of each of the supplied executable code and generated executable code, and comparing said hashes to determine the verification metric.

4. The method as claimed in claim 1, wherein analyzing the decrypted source code to determine the trust metric comprises determining whether the decrypted source code, when compiled and executed by a processor, attempts to do at least one of the following: open a port; access a memory address; install a further software application; and/or run a further software application.

5. The method as claimed in claim 1, wherein analyzing the decrypted source code comprises determining whether every line of code and/or conditional branch has been followed in a test.

6. The method as claimed in claim 1, further comprising generating feedback data comprising information, and transmitting said feedback data to the vendor.

7. The method as claimed in claim 1, further comprising generating an attestation report comprising the trust metric and providing said attestation report to the vendor.

8. The method as claimed in claim 1, comprising outputting the generated executable code from the trusted execution environment.

9. The method as claimed in claim 1, comprising receiving a supplied executable code into the trusted execution environment and comparing the supplied executable code to the generated executable code, within the trusted execution environment, to determine a verification metric for the supplied executable code.

10. The method as claimed in claim 1, wherein the trusted execution environment is a secure processing environment that is configured to securely attest itself to a user.

11. A non-transitory computer-readable medium comprising instructions that, when executed by a processor, cause the processor to operate a trusted execution environment for analyzing source code received, by a recipient, from a vendor by:

receiving an encrypted source code into the trusted execution environment;

receiving supplied data into the trusted execution environment, wherein the supplied data is validation data supplied by the vendor or specification data supplied by the recipient;

using a secure key stored within the trusted execution environment to decrypt the encrypted source code within the trusted execution environment to produce a decrypted source code;

analyzing the decrypted source code within the trusted execution environment to determine a trust metric for the decrypted source code;

compiling the decrypted source code within the trusted execution environment to produce generated executable code;

outputting the generated executable code from the trusted execution environment, or receiving a supplied executable code into the trusted execution environment and comparing the supplied executable code to the generated executable code to determine a verification metric for the supplied executable code; and disallowing the decrypted source code from being communicated to an external entity outside of the trusted execution environment;

wherein the analyzing the decrypted source code to determine a trust metric comprises:

performing analysis on the decrypted source code and/or code derived from said decrypted source code and/or an object derived from said decrypted source code, within the trusted execution environment, to generate test data; and comparing the supplied data to the test data within the trusted execution environment; and wherein the trust metric comprises an indicator dependent on a similarity between the supplied data and the test data.

12. The non-transitory computer-readable medium as claimed in claim 11, wherein the verification metric comprises a measure of similarity between the generated executable code and the supplied executable code.

13. The non-transitory computer-readable medium as claimed in claim 11, wherein the step of comparing the supplied executable code to the generated executable code further comprises generating a hash of each of the supplied executable code and generated executable code, and comparing said hashes to determine the verification metric.

14. The non-transitory computer-readable medium as claimed in claim 11, wherein analyzing the decrypted source code to determine the trust metric comprises determining whether the decrypted source code, when compiled and executed by a processor, attempts to do at least one of the following: open a port; access a memory address; install a further software application; and/or run a further software application.

15. The non-transitory computer-readable medium as claimed in claim 11, further comprising instructions that, when executed by the processor, cause the processor to:

generate feedback data comprising information, and transmit said feedback data to the third party vendor.

16. The non-transitory computer-readable medium as claimed in claim 11, further comprising instructions that, when executed by the processor, cause the processor to generate an attestation report comprising the trust metric and provide said attestation report to the vendor.

17. The non-transitory computer-readable medium as claimed in claim 11, further comprising instructions that, when executed by the processor, cause the processor to output the generated executable code from the trusted execution environment.

18. The non-transitory computer-readable medium as claimed in claim 11, further comprising instructions that, when executed by the processor, cause the processor to receive a supplied executable code into the trusted execution environment and compare the supplied executable code to the generated executable code to determine a verification metric for the supplied executable code.

19. The non-transitory computer-readable medium as claimed in claim 11, wherein the trusted environment is a secure processing environment that is configured to securely attest itself to a user.

20. An electronic device comprising a first processing portion and a second processing portion, said second processing portion being isolated from the first processing portion, wherein the second processing portion comprises a trusted execution environment arranged to analyze source code received, by a recipient, from a vendor, the trusted execution environment comprising an analysis unit and a secure memory arranged to store a secure key, wherein an external entity comprises the first processing portion, and wherein the trusted execution environment is arranged to:
  receive an encrypted source code into the trusted execution environment;
  receive supplied data into the trusted execution environment, wherein the supplied data is validation data supplied by the vendor or specification data supplied by the recipient;
  use a secure key stored within the trusted execution environment to decrypt the encrypted source code within the trusted execution environment to produce a decrypted source code;
  analyze the decrypted source code within the trusted execution environment to determine a trust metric for the decrypted source code;
  compile the decrypted source code within the trusted execution environment to produce generated executable code;
  output the generated executable code from the trusted execution environment, or receive a supplied executable code into the trusted execution environment and compare the supplied executable code to the generated executable code to determine a verification metric for the supplied executable code; and
  disallow the decrypted source code from being communicated to the external entity outside of the trusted execution environment;
  wherein the analyzing the decrypted source code to determine a trust metric comprises:
  performing analysis on the decrypted source code and/or code derived from said decrypted source code and/or an object derived from said decrypted source code, within the trusted execution environment, to generate test data; and
  comparing the supplied data to the test data within the trusted execution environment; and
  wherein the trust metric comprises an indicator dependent on a similarity between the supplied data and the test data.

\* \* \* \* \*